United States Patent
Beskow et al.

(10) Patent No.: US 8,407,852 B2
(45) Date of Patent: Apr. 2, 2013

(54) VACUUM CLEANER AGITATOR CLUTCH

(75) Inventors: Jonas Beskow, Stockholm (SE); Anders Haegermarck, Trångsund (SE)

(73) Assignee: Electrolux Home Care Products, Inc., Charlotte, NC (US)

( * ) Notice: Subject to any disclaimer, the term of this patent is extended or adjusted under 35 U.S.C. 154(b) by 594 days.

(21) Appl. No.: 12/473,136

(22) Filed: May 27, 2009

(65) Prior Publication Data

US 2010/0299867 A1  Dec. 2, 2010

(51) Int. Cl.
*A47L 5/10* (2006.01)
*A47L 5/26* (2006.01)

(52) U.S. Cl. .......................................... 15/390
(58) Field of Classification Search .............. 15/390
See application file for complete search history.

(56) References Cited

U.S. PATENT DOCUMENTS

| | | | |
|---|---|---|---|
| 1,462,046 A * | 7/1923 | Reddig | 192/69.63 |
| 2,112,318 A * | 3/1938 | White et al. | 192/56.53 |
| 2,551,718 A * | 5/1951 | Auten | 464/23 |
| 3,228,209 A | 1/1966 | Hersey | |
| 3,797,621 A | 3/1974 | James | |
| 3,971,463 A * | 7/1976 | Zindler | 192/105 BA |
| 4,235,321 A | 11/1980 | Stein | |
| 4,317,253 A * | 3/1982 | Gut et al. | 15/390 |
| 4,357,730 A * | 11/1982 | Lex | 15/344 |
| 4,467,495 A | 8/1984 | Fish et al. | |
| 4,532,667 A | 8/1985 | Komesker et al. | |
| 4,614,003 A | 9/1986 | Martin | |
| 4,766,641 A | 8/1988 | Daglow | |
| 5,014,388 A | 5/1991 | Schiazza et al. | |
| 5,601,491 A | 2/1997 | Chan et al. | |
| 5,781,960 A | 7/1998 | Kilstrom et al. | |
| 6,122,796 A | 9/2000 | Downham et al. | |
| 6,553,611 B2 | 4/2003 | Huebsch et al. | |
| 6,691,849 B1 * | 2/2004 | Dyson et al. | 192/55.1 |
| 7,228,593 B2 | 6/2007 | Conrad | |
| 2008/0105510 A1 | 5/2008 | Burlington et al. | |
| 2012/0005857 A1 * | 1/2012 | Tran et al. | 15/390 |

OTHER PUBLICATIONS

International Search Report mailed Jul. 26, 2010, PCT/US10/36059 (2 pages).

* cited by examiner

*Primary Examiner* — Bryan R Muller
(74) *Attorney, Agent, or Firm* — RatnerPrestia

(57) ABSTRACT

A vacuum cleaner clutch assembly having an input driven by a motor, an output to drive an agitator, a starter clutch and a drive clutch. The starter clutch moves between an engaged position in which it receives a first drive torque from the input, and a disengaged position in which it receives substantially no torque directly from the input. The drive clutch is moveable between an engaged position in which it receives a second drive torque from the input, and a disengaged position in which it receives substantially no torque directly from the input. When engaged, the starter clutch is coupled to the drive clutch to transmit the first drive torque to the drive clutch to move the drive clutch into the engaged drive clutch position. When engaged, the drive clutch is coupled to the clutch assembly output to transmit the second drive torque to the output.

17 Claims, 19 Drawing Sheets

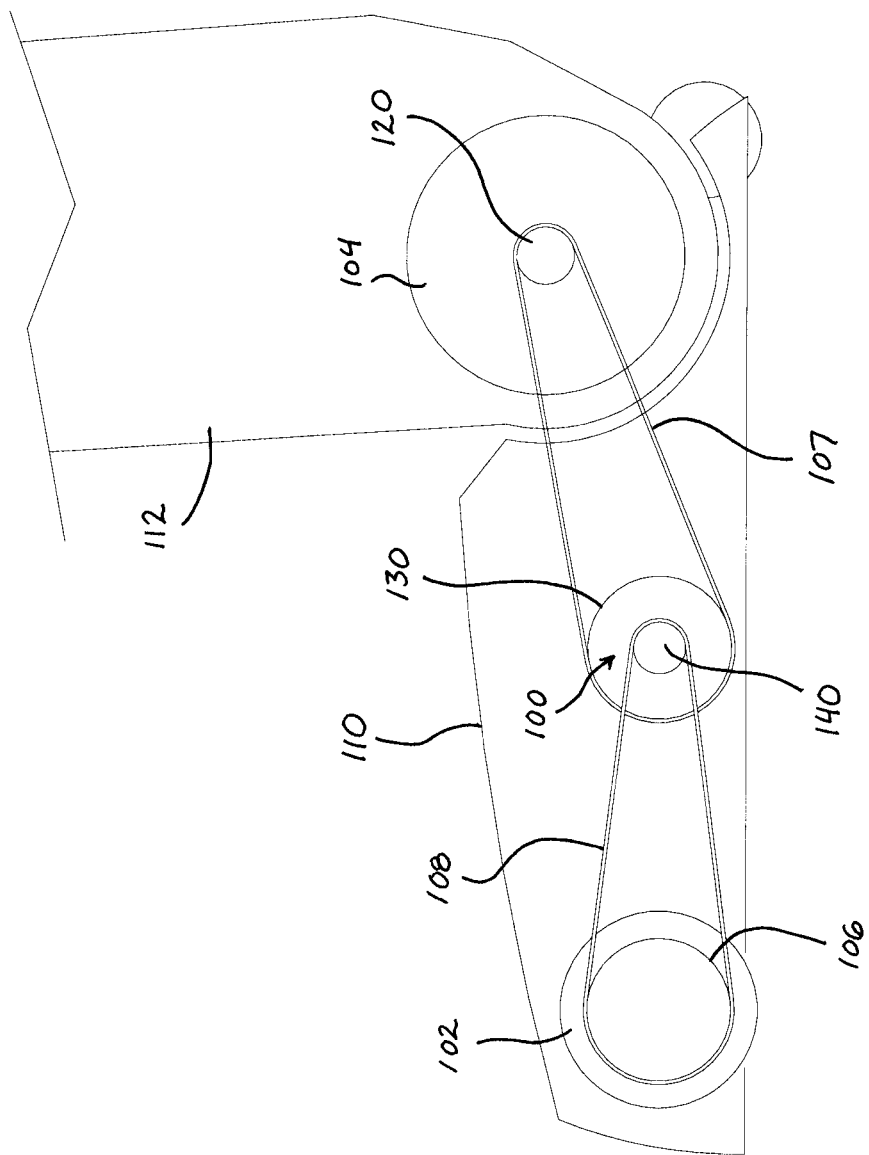

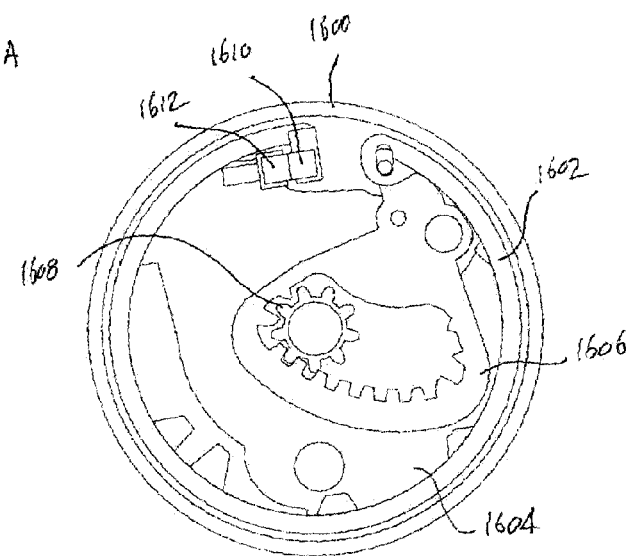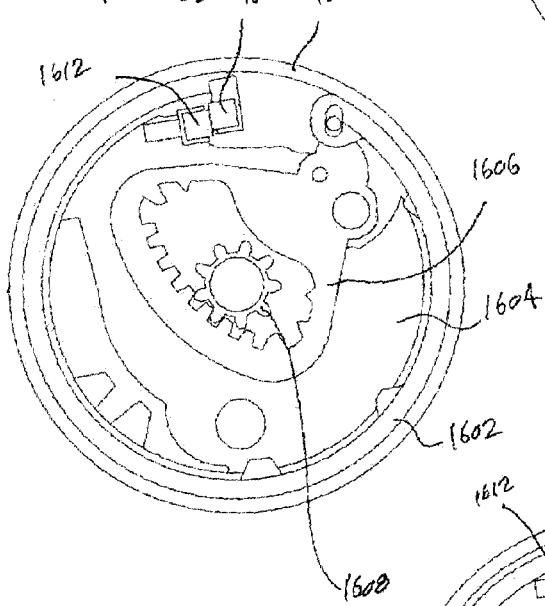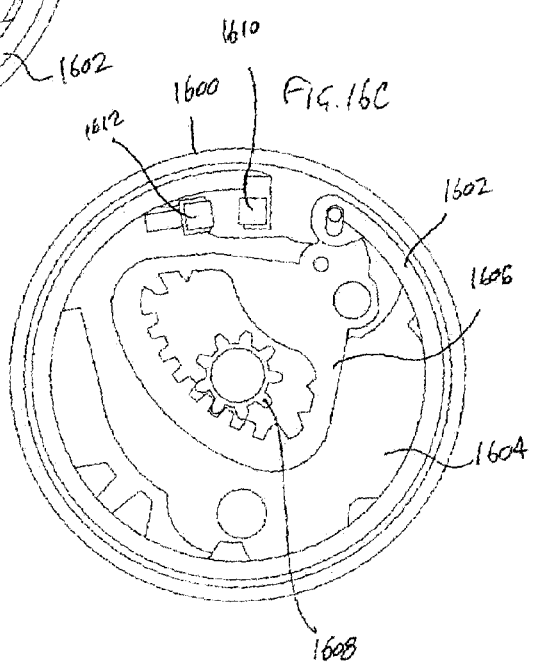

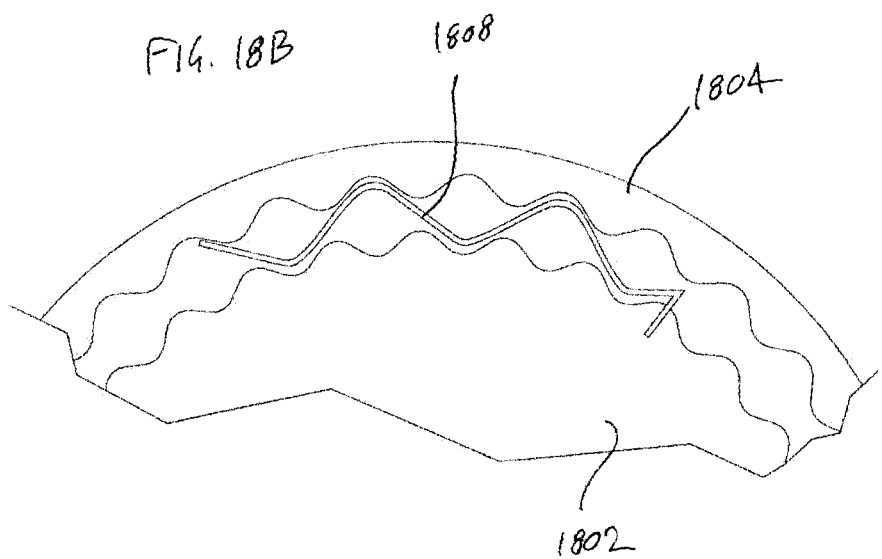
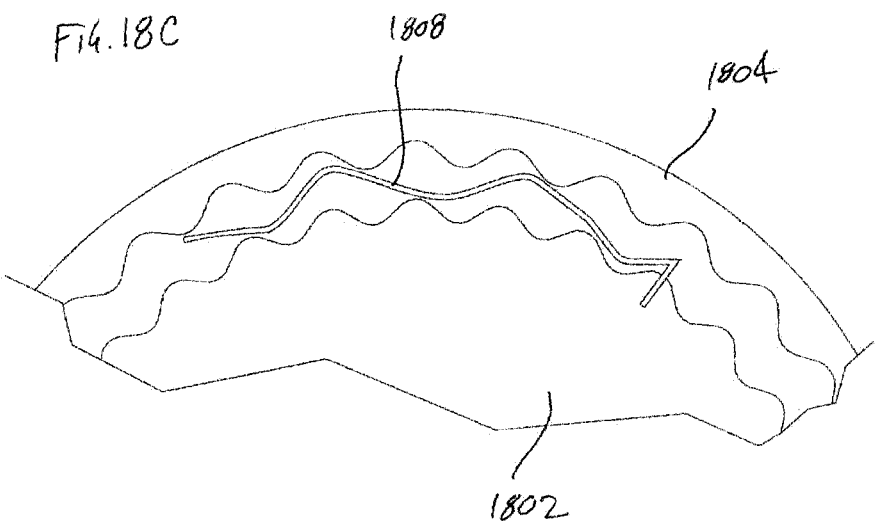

VACUUM CLEANER AGITATOR CLUTCH

FIELD OF THE INVENTION

The present invention relates to clutch assembly features for use with vacuum cleaners. More specifically, the present invention relates to a clutch assembly for transferring power from a vacuum cleaner motor unit to the brushroll. It will be understood that the features of the clutch assembly may be used in other types of equipment and/or appliances, and may be used in part, and in combination with other driveline features.

BACKGROUND OF THE INVENTION

It is well known that vacuum cleaners, such as upright vacuums, may use a rotating brushroll to help clean various surfaces, such as carpeting. Canister type vacuum cleaners may also use a power head having a rotating brushroll, as is known in the art. The brushroll typically rotates about a horizontal axis and provides surface agitation to release dirt and dust trapped in and upon the surface being cleaned. Once agitated, the dirt and dust are sucked into the vacuum cleaner through the dirty air inlet. Suction force is typically generated by a fan motor unit.

The brushroll is typically driven by a motor. The vacuum may have one motor that provides both suction and drive power for the brushroll (a so-called "single-motor" vacuum). Alternatively, the vacuum may have two motors—one for generating suction and one for driving the brushroll. Such a "two-motor" vacuum configuration may have the drawback of increased weight and cost, but may be favored where separate control of the suction fan and brushroll are desired, or the fan motor is for some reason not capable of driving the brushroll. Power from a motor, in any configuration, must be transferred from the motor to the brushroll. The brushroll may be driven at a slower rotational speed than the motor. For example, a motor may operate at over 10,000 revolutions per minute (rpm), and it may be desirable to rotate the brushroll at a slower speed, such as 3,000 rpm. As is known in the art, a drive belt is typically used for driving the brushroll. The belt typically is a high strength, long life belt that may be flat or ridged or toothed. A reduction gear and clutch mechanism may be provided. A cogged belt and/or reduction gears also may be used to provide gearing reduction. Some vacuums may alternatively use a direct drive from the motor to the brushroll, or incorporate the motor in the brushroll.

While brushrolls are commonly used and typically beneficial, they present a potential problem in that the brushroll may continue to rotate even when it is not desirable. For example, rotation may continue when the vacuum is stopped or placed into an upright position with the power still on, or when cleaning smooth floors that may not benefit from a brushroll. In fact, damage to the surface below the rotating brushroll may result from the brushroll rotating in one place. For example, carpet fibers may become worn or burned from frictional heat generated from the continuous rotation of the brushroll over a small part of the carpet. In a typical single-motor vacuum with a direct drive brushroll, there may be no independent control over the brushroll, such that in order to stop the brushroll, the vacuum itself may need to be turned off. Some single-motor vacuums may incorporate a lifting mechanism for the brushroll, which lifts the brushroll off the floor when the vacuum is placed in the upright position or when it is desired to clean smooth floors, but the rotation of the brushroll may continue. In other designs, an idler pulley configuration may be used, in which the drive belt is placed upon an idler pulley when the vacuum is placed in the upright position or when it is desired to clean smooth floors, stopping the brushroll rotation. In such devices, the driven belt must be replaced upon the driven pulley to resume operation, which often requires a mechanically complex and potentially unreliable mechanism to disengage and engage the brushroll. In other cases, a clutch mechanism may be used to disengage the brushroll.

Two-motor vacuum cleaners have potential to provide greater control over when the brushroll is rotating, because the brushroll motor can be operated by manually or automatically operated switches to turn the brushroll on and off independently of the vacuum source motor. Such devices can be heavier and more expensive than single-motor vacuums.

Another potential problem with brushrolls is that they can become jammed. For example, a foreign object may become lodged into the brushroll and prevent rotation. When this happens, the drive motor could overheat (particularly if the motor stops when the brushroll stops) and/or the drive belt or other drive mechanisms could be damaged. During such jams, it is desirable to disengage or stop drive power to the brushroll to prevent damage to the vacuum or the foreign object. Some vacuums use thermally-operated switches to cut off power to the motor when an overheating condition is reached. Other vacuums use a non-replaceable fuse that renders the vacuum inoperative and irreparable if the motor locks. The vacuum also may be designed with the belt as the weakest link, so that the belt typically fails during a severe jam condition. Still other vacuums use a clutch mechanism which may disengage or slip under a high torque condition.

Different clutch mechanisms are known in the art. Clutch mechanisms are used to provide both a power transfer function and a torque limiting function through the use of various structural configurations, such as friction plates, flexible couplings, springs, detent plates, wave plates, and magnetic couplings. Exemplary clutch mechanisms with application to vacuums incorporating some of the aforementioned features are described in U.S. Pat. Nos. 3,228,209; 3,797,621; 4,235,321; 4,532,667; 4,766,641; 5,601,491; 6,691,849; and 7,228,593; which references are incorporated herein.

It has been found that many different requirements may be desired of vacuum cleaner brushroll drive and clutch mechanisms. For example, such requirements sometimes include: operate in the overload condition for a long time without overheating; survive numerous disengagement and reengagement cycles; operate automatically to address different cleaning modes (e.g., turn off the brushroll during accessory cleaning operations and when vacuuming on bare floors); operate manually to allow the user to selectively disengage the brushroll; operate in dusty environments; and so on. Some of these requirements may oppose one another in various respects. For example, it is desirable to provide a brushroll overload clutch that will disengage drive torque to the brushroll immediately upon reaching an overload torque value, to better protect any objects that contact the brushroll, the brushroll, and the drive components. While this could be accomplished using an overload clutch having a relatively low overload torque value, the clutch may be so sensitive that it will disengage when it is not desired, such as when the brushroll is started on thick carpets or moved rapidly from a smooth surface to a carpeted surface.

While various prior art devices, such as those described above, have been used, there exits a need to provide alternatives to such devices.

SUMMARY OF THE INVENTION

In a first exemplary aspect, there is provided a clutch assembly for a vacuum cleaner. The clutch assembly includes an input adapted to be driven by a motor, an output adapted to drive an agitator, a starter clutch and a drive clutch. The starter clutch is moveable between an engaged starter clutch position in which the starter clutch receives a first drive torque from the clutch assembly input, and a disengaged starter clutch position in which the starter clutch receives substantially no torque directly from the clutch assembly input. The drive clutch is moveable between an engaged drive clutch position in which the drive clutch receives a second drive torque from the clutch assembly input, and a disengaged drive clutch position in which the drive clutch receives substantially no torque directly from the clutch assembly input. The starter clutch is coupled to the drive clutch such that the starter clutch, when in the engaged starter clutch position, can transmit the first drive torque to the drive clutch to move the drive clutch into the engaged drive clutch position. The drive clutch is coupled to the clutch assembly output such that the drive clutch, when in the engaged drive clutch position, can transmit the second drive torque to the clutch assembly output. In various other aspects, the clutch assembly may include an overload clutch that disengages torque transfer from the clutch assembly input to the clutch assembly output.

In another exemplary aspect, there is provided a clutch assembly for a vacuum cleaner in which the clutch assembly has a clutch assembly input adapted to be driven by a motor, a clutch assembly output adapted to drive an agitator, a drive clutch adapted to selectively transmit a drive torque from the clutch assembly input to the clutch assembly output, and a starter clutch adapted to selectively engage the drive clutch by transmitting a starting torque from the clutch assembly input to the drive clutch.

In another exemplary aspect, there is provided a clutch assembly for a vacuum cleaner in which the clutch assembly has a clutch assembly input adapted to be driven by a motor, a clutch assembly output adapted to drive an agitator, and a drive clutch adapted to selectively transmit a drive torque from the clutch assembly input to the clutch assembly output. The drive clutch includes a self-adjusting clutch that increases the drive torque as a rotational resistance of the clutch assembly output increases.

The recitation of this summary of the invention is not intended to limit the claimed invention. Other variations are encompassed by the appended claims and disclosed herein, and other aspects, embodiments, modifications to and features of the claimed invention will be apparent to persons of ordinary skill in view of the disclosures herein. Furthermore, this recitation of the summary of the invention, and the other disclosures provided herein, are not intended to diminish the scope of the claims in this or any related or unrelated application.

BRIEF DESCRIPTION OF THE DRAWINGS

The present invention is described in detail with reference to the examples of embodiments shown in the following figures in which like parts are designated by like reference numerals.

FIG. 1B is a schematic side view of the vacuum cleaner base assembly of FIG. 1A.

FIG. 16A is a side view of an alternative exemplary embodiment of a clutch assembly shown in the disengaged position.

FIG. 16B illustrates the assembly of FIG. 16A in the engaged position.

FIG. 16C illustrates the assembly of FIG. 16A in the overload condition.

FIG. 18B is a side view of the clutch mechanism of FIG. 18A in the engaged position.

FIG. 18C is a side view of the clutch mechanism of FIG. 18A in the disengaged position.

DETAILED DESCRIPTION OF EMBODIMENTS OF THE INVENTIONS

The present disclosure provides numerous inventive features relating to embodiments of a clutch assembly for use in a vacuum cleaner or in other appliances or machines. Various features and alternative embodiments of the invention are described with reference to their exemplary use in certain embodiments, but it will be readily appreciated that the features could alternatively be incorporated into other embodiments of vacuum cleaners. The invention includes these and other variations, as will be appreciated by persons of ordinary skill in the art in view of the present disclosure. Furthermore, the various features described herein may be used separately from one another or in any suitable combination. The present disclosure illustrating various exemplary embodiments is not intended to limit the invention in any way.

An exemplary first embodiment of the invention is illustrated in FIGS. 1-12, which generally illustrate a clutch assembly 100 for an upright vacuum, canister vacuum power head, or any other type of vacuum cleaner that uses a driven brushroll. The descriptions herein of this embodiment and other embodiments of the clutch assembly 100 will focus on application in a vacuum cleaner, but it will be understood that the clutch assembly 100 may be used in other types of equipment and appliances. For example, the clutch assembly 100 has application to any mechanism that may require a transfer of power, in the form of rotational energy or torque, from an input (such as a motor drive) to a driven output (such as a brushroll), in which it is desired to provide a means to engage and disengage the driven output on command or during overload conditions. As will be appreciated from the disclosure herein, the exemplary clutch assembly 100 may be configured to provide both overload protection to the equipment (such as by decoupling the output drive from the input drive), and a means for selectively engaging and disengaging the motor from the driven assembly to initiate and cease operation of the driven assembly when desired. However, these two features and functions may be provided separately, and are not required in all embodiments of the invention.

Figure 1A:
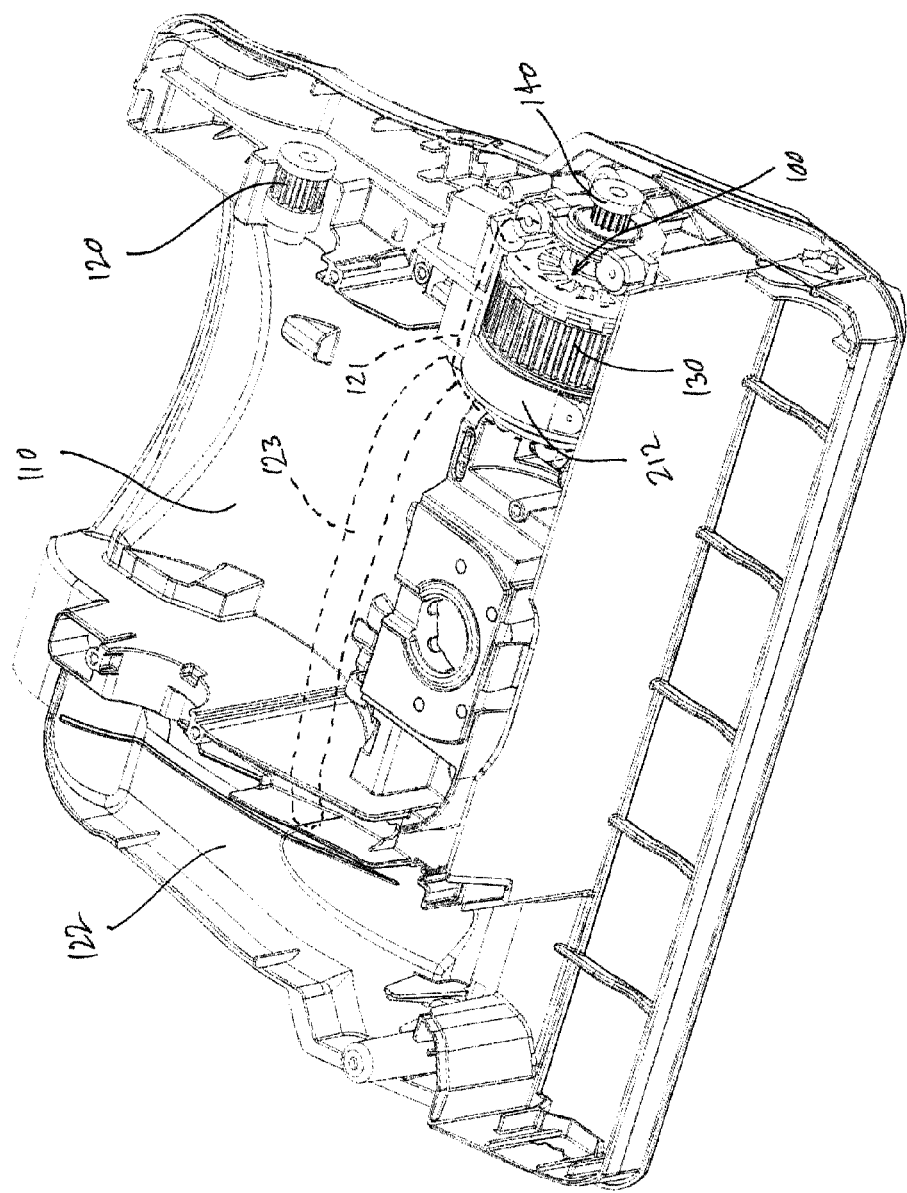
FIG. 1A is a fragmented perspective view of a vacuum cleaner base assembly in accordance with an exemplary first embodiment.

As shown in FIG. 1A, the exemplary clutch assembly 100 may be mounted in a base assembly 110 of a vacuum cleaner. The base assembly 110 is shown with the upper cover removed to depict the clutch assembly 100 and driven agitator, such as a brushroll 102. In this embodiment, a fan motor 104 is provided to simultaneously drive a vacuum fan and the clutch assembly 100. The fan motor 104 may be mounted in the base assembly 110, or mounted in an upright housing 112 that is pivotally mounted to the base assembly 110, as known in the art. Examples of fan motor locations are shown in U.S. Pat. Nos. 6,122,796, 6,553,611, and 5,014,388, which are incorporated herein. The base assembly 110 also may comprise the frame of a self-propelled vacuum cleaner, such as shown in U.S. Pat. No. 5,781,960, which is incorporated herein. Alternatively, the fan motor 104 may be replaced by another motor that does not drive a vacuum fan. As will also be appreciated, the brushroll 102 may comprise or be replaced by any suitable agitator device, as are well-known in the art. For example, an exemplary agitator may include a rotating spindle having helical rows of flexible bristles, flexible flaps, rigid beater bars, or combinations of such devices that are intended to contact and agitate the surface being cleaned to help dislodge or remove dirt from the surface.

The location of the clutch assembly 100 may be based on space, weight, and power transmission considerations for the particular vacuum cleaner or specific application, as known in the art, and it may be located in alternate positions from that depicted in FIG. 1. The base assembly 100 may be located on or form part of an upright vacuum cleaner or a power head of a canister or central vacuum cleaner. Examples of upright vacuums are provided above, and examples of power heads are provided in U.S. Pat. Nos. 4,467,495 and 4,614,003, which are incorporated herein by reference.

In the exemplary embodiment, the fan motor 104 drives a motor output gear 120, which is drivingly connected to a clutch input gear 130 on the clutch assembly 100 by a motor belt 107. The motor belt 107 may be any type of belt, such as a toothed belt with a plurality of spaced teeth on an inner surface thereof to engage with the spaced teeth of the first and clutch input gear wheels. The drive belt may be a reinforced, high strength belt for durability and lasting function. In other embodiments, a flat, ribbed or v-type drive belt may be used, as known in the art. Of course, the motor output gear 120 and clutch input gear 130 may be replaced with other types of pulley, cog or gear, as necessary or desired to accommodate power transfer from the motor 104 to the clutch assembly 100.

As depicted in FIG. 1A, the motor output gear 120 may have a smaller diameter than the clutch input gear 130. The diameter size difference may provide a speed reduction, such that the clutch input gear 130 may rotate slower than the motor output gear 120. This speed reduction may be desirable because a typical vacuum motor may operate at a speed greater than the desired brushroll speed.

The exemplary clutch assembly 100 may also have a clutch output gear 140. The clutch output gear 140 may be connected by a brushroll belt 108 (FIG. 1B) to a brushroll input gear 106 that drives the brushroll 102. The brushroll input gear 106 may be any suitable gear or pulley, and may be located on, inside, or adjacent to the brushroll. The clutch output gear 140, brushroll belt 108 and brushroll input gear 106 may comprise any suitable kind of gear or belt. For example, the brushroll belt 108 may be a toothed belt similar to the motor belt 107, or may be flat, ribbed, or otherwise shaped. The difference in size between the clutch output gear 140 and the brushroll input gear 106 may provide a further gear reduction. For example, the fan motor 104 may operate at about 30,000 RPM and the brushroll may operate at about 4,000 RPM, with a total gear reduction ratio of about 7.4:1. While in some embodiments, the brushroll may operate at a speed of over one thousand RPM, speeds below this may be possible in other embodiments. Of course, other reduction ratios may be used in other embodiments (for example, the clutch input gear 130 may be the same diameter as the clutch output gear 140), and in still other embodiments there may be no reduction or even a speed-increasing ratio.

The clutch assembly 100 may be mounted to the base assembly 110 in any suitable way. For example, the clutch assembly 100 may be mounted in the same way a typical brushroll motor would be mounted in a typical vacuum cleaner base or powerhead. Such a mounting may be by one or more fasteners, such as screws, straps or bolts. In an exemplary embodiment, a clutch assembly mount 212, such as hereinafter described, may be used. The clutch assembly 100 also may be compression fitted into the base assembly, such as by using a snap tight fit with plastic tabs. One or more elastic bushings may be located between the clutch assembly 100 and the base assembly 110 to reduce vibrations and/or accommodate variations in manufacturing tolerances. It may also be desirable to make the clutch assembly 100 removable from the base assembly to facilitate repairs and maintenance. Of course, in other embodiments, the clutch assembly 100 may not be removable from the base assembly 110.

Figure 2:
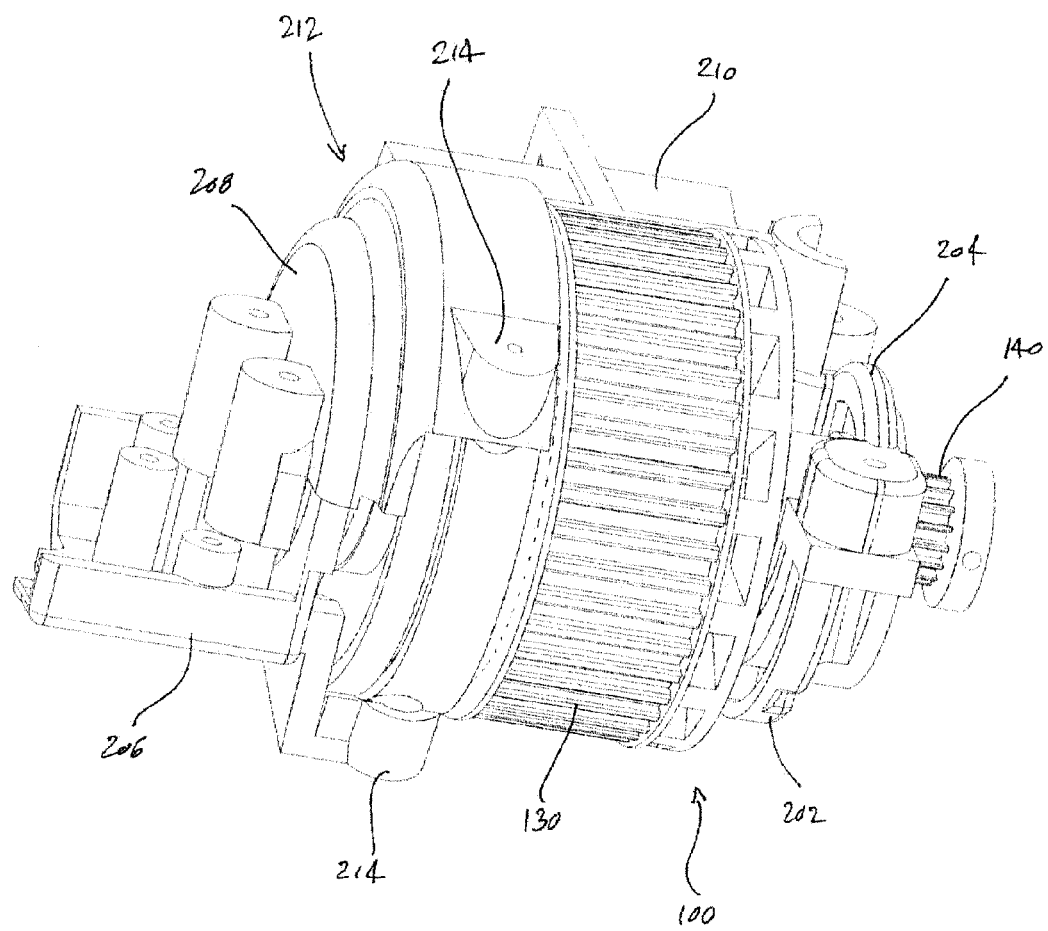
FIG. 2 is a perspective view of a clutch assembly and mounting and support structure in accordance with an exemplary first embodiment.
Figure 3:
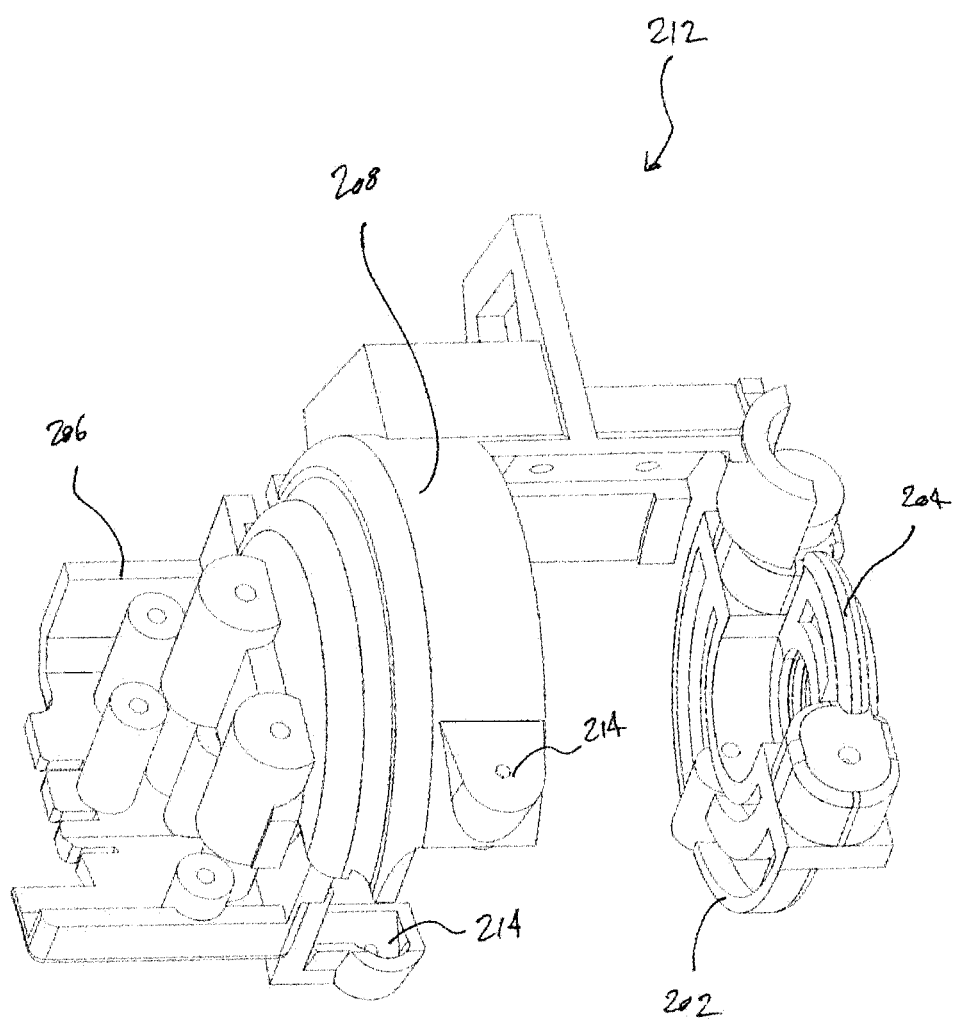
FIG. 3 is a first perspective view of the mounting and support structure for the clutch assembly of FIG. 2.
Figure 4:
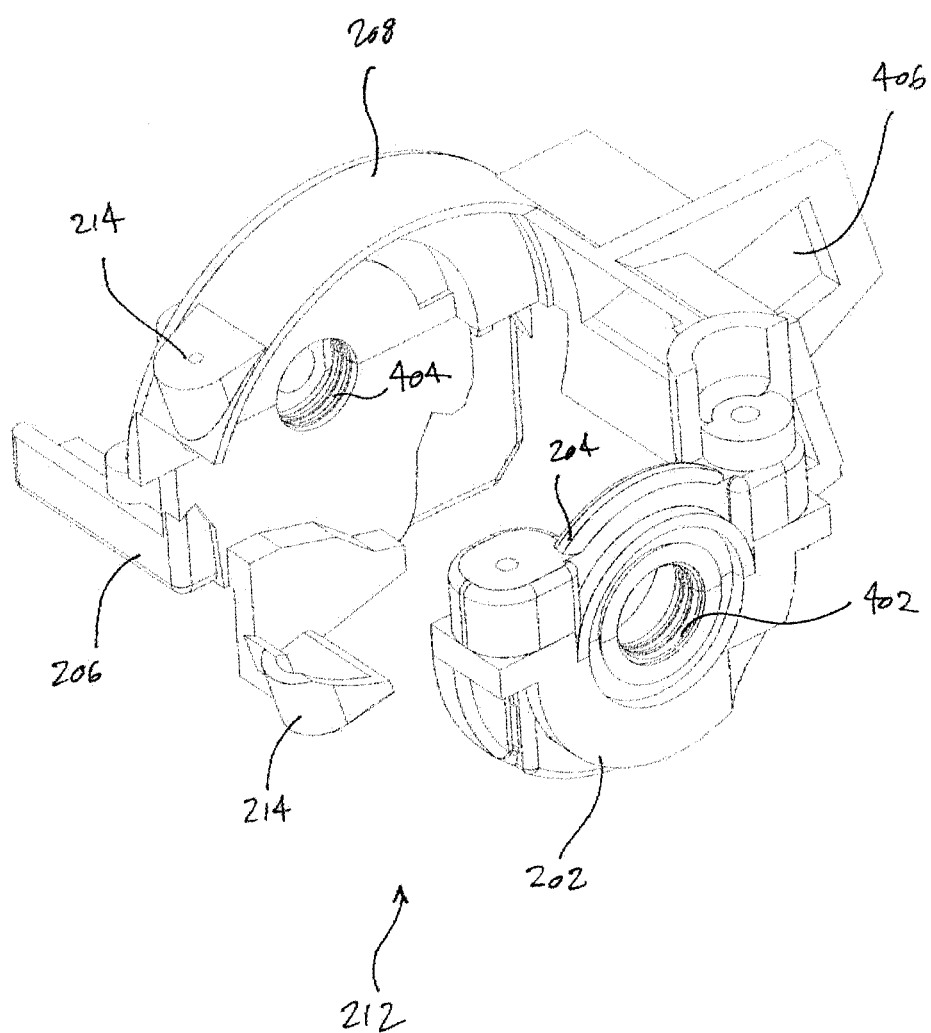
FIG. 4 is a second perspective view of the mounting and support structure for the clutch assembly of FIG. 2.

FIG. 2 depicts the clutch assembly 100 removed from the base assembly 110 to help illustrate an exemplary clutch assembly mount 212. FIGS. 3 and 4 depict the clutch assembly mount 212 with the clutch assembly 100 removed. As shown, the exemplary clutch assembly mount 212 may include an outer base module 202, an outer bearing holder 204, an inner base module 206, and an inner bearing holder 208 (as used in reference to the clutch assembly mount 212, the terms "outer" and "inner" refer to positions with respect to the centerline of the base assembly 110). In this embodiment, the clutch assembly 100 is secured, at one end, by the outer base module 202, and, at the other end, by the inner base module 206. The outer and inner base modules 202, 206 may be secured to the base assembly 110 with one or more fasteners (not shown). The outer and inner bearing holders 204, 208 are mounted to the upper surfaces of the outer and inner base modules 202, 206, respectively. The outer and inner bearing holders capture bearings 604a, 604d (see FIGS. 5 and 6) in place to thereby rotatably mount the clutch assembly 100 in the clutch assembly mount 212. The bearings 604a, 604d are secured in cavities 402, 404 (FIG. 4) that are shaped to hold the bearings 604a, 604d. The cavities 402, 404 may have ridges, such as shown, to accommodate and securely hold the bearings 604a, 604b against axial movement. While bearings may be used on some embodiments, journals or other rotating mounting structures may be used to rotatably hold the clutch assembly 100 in the clutch assembly mount 212.

The clutch assembly mount 212 may include other functional or structural elements, such as a cut-out 406 to mount and support a solenoid 210. The purpose of the solenoid 210 is described subsequently herein. The clutch assembly mount 212 may also include, for example, pivot mounts 214 to pivotally hold corresponding pivots 503 on a disengagement lever 502, as described below. If desired, the clutch assembly mount may also include shroud 121 that encases the clutch assembly 100, and an air passage 123 to a vacuum source, such as a suction inlet passage 122 in the base assembly 110. In such an embodiment, the vacuum source may draws air through the shroud and over the clutch assembly 100 to cool the clutch assembly 100 and remove any particulate matter that the clutch assembly 100 may generate during use.

Figure 5:
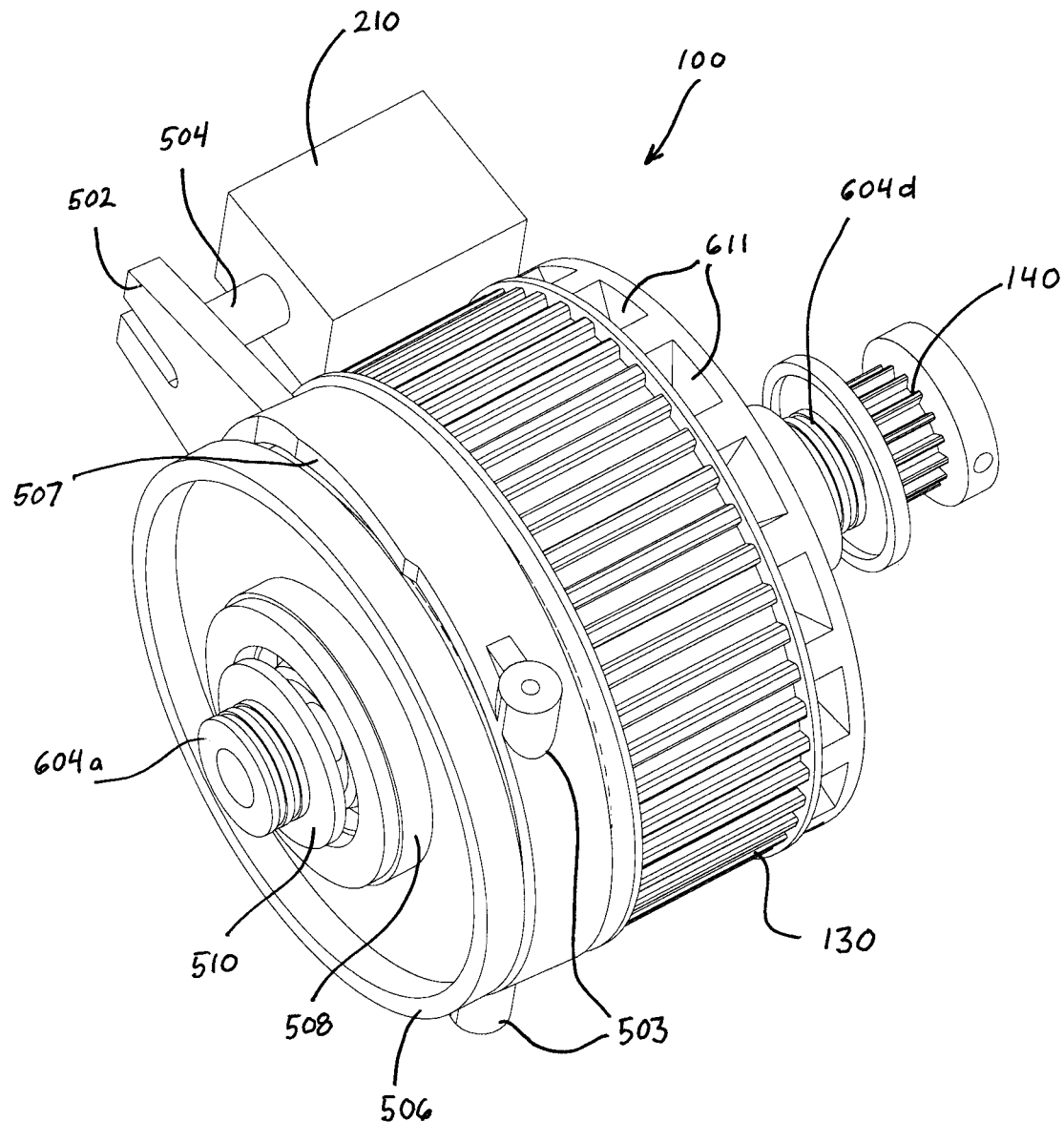
FIG. 5 is a perspective view of the clutch assembly of FIG. 2.
Figure 6:
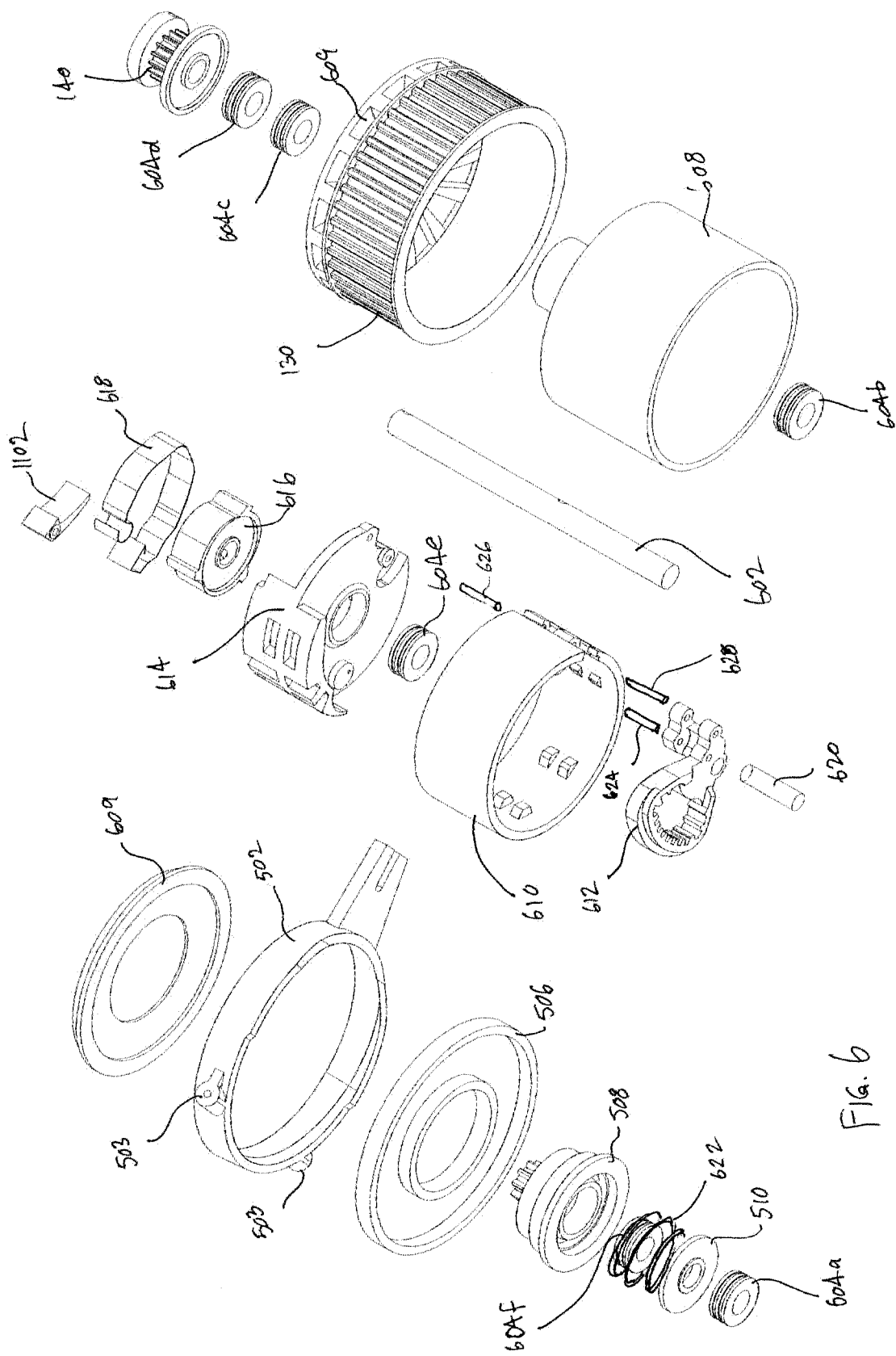
FIG. 6 is an exploded view of the clutch assembly and mounting and support structures of FIG. 2.
Figure 7:
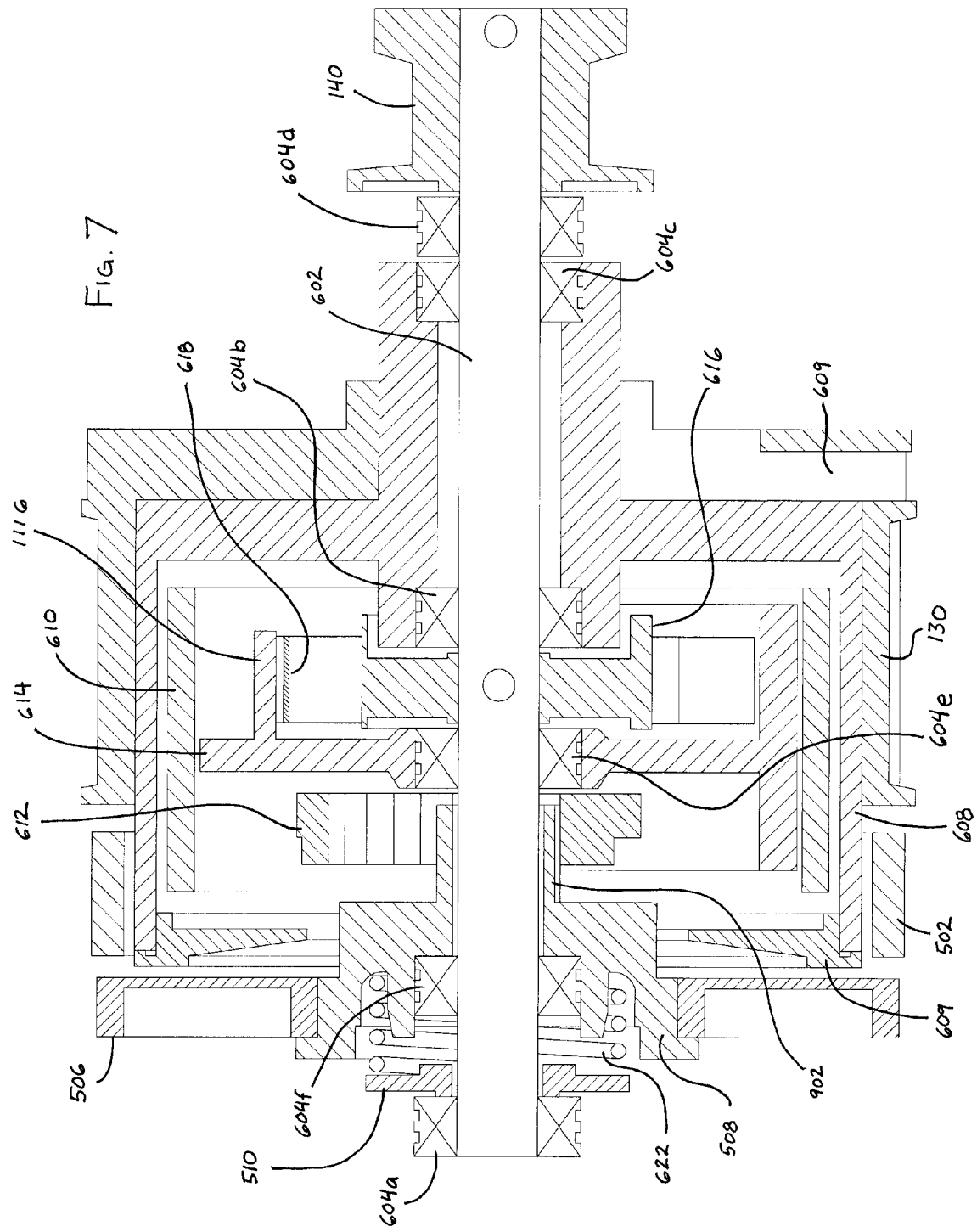
FIG. 7 is a cut-away view of the clutch assembly of FIG. 2.

Turning to FIGS. 5-7, the first exemplary embodiment of a clutch assembly 100 is described in detail. The external features of the clutch assembly 100 are best shown in FIG. 5, with the clutch assembly mount 212 removed. As shown, the clutch assembly 100 may have a clutch input gear 130, a clutch output gear 140, a solenoid 210 with a solenoid shaft 504, a disengagement lever 502, a flywheel 508 with a perimeter weight 506, and a flywheel spring holder 510.

The clutch assembly 100 may receive an input, in the form of rotational torque, through the clutch input gear 130, as described above. Generally speaking, the clutch assembly 100 of this exemplary embodiment transfers the input torque to the clutch output gear 140, as briefly described above. In the hereinafter described first exemplary embodiment, the clutch assembly 100 may provide several functions. First, it includes mechanisms that selectively provide torque transfer from the clutch input gear 130 to the clutch output gear 140 in an engaged position, and prevent such torque transfer in a disengaged position. This aspect is referred to sometimes herein as the drive clutch feature. Second, it includes mechanisms that automatically prevent or substantially reduce torque transfer from the clutch input gear 130 to the clutch output gear 140 upon detecting an overload condition. This aspect is referred to sometimes herein as the overload clutch feature. Thus, in this exemplary embodiment, the clutch assembly 100 may be set in an engaged position in which torque is intended to be transferred from the clutch input gear 130 to the clutch output gear 140, but such torque transfer may be prevented due to an overload condition. Further, the mechanisms the terminate torque transfer after sensing an overload may not allow transmission of torque until after the clutch assembly has been reset to the disengaged position.

In the exemplary embodiment, the drive clutch feature defaults to the engaged position. That is, power is transferred via the clutch assembly 100 from the clutch input gear 130 to the clutch output gear 140 unless the clutch assembly 100 is set to a disengaged position. Any suitable mechanical or electrical device may be used to move the clutch assembly 100 into the disengaged position. In the exemplary embodiment the clutch assembly 100 is disengaged by moving the flywheel 508 and its associated flywheel weight 506 away from engagement with a drum 608 and its associated drum lid 609. The manner in which this accomplishes clutch disengagement is described in detail below. In this exemplary embodiment, the flywheel 508 is biased into engagement with the drum 608 by a spring 622 (FIG. 6) that is captured between the flywheel spring holder 510 and the flywheel 508. The flywheel weight 506 is formed as part of the flywheel 508 or rigidly connected to it.

The disengagement lever 502 is provided to move the flywheel 508 against the bias of the spring 622. This is done by pivoting the disengagement lever 502 (which rotates on its pivots 503) away from the drum 608. Any suitable mechanism may be used to move the disengagement lever 502. For example, a solenoid 210 having a solenoid shaft 504 that extends when the solenoid is activated, may be positioned adjacent the disengagement lever 502. When the solenoid 210 is energized, the shaft 504 extends and moves the disengagement lever 502 away from the drum 608. As the disengagement lever 502 pivots, its side surface 507 presses against and moves the flywheel 508 (via contact with the flywheel weight 506) away from the drum 608, thereby disengaging the clutch mechanism 100. The side surface 507 may frictionally engage the flywheel 508 to decelerate it when it is disengaged, and the disengagement lever 502 may press the opposite side of the flywheel into frictional engagement with other surfaces, such as an inner wall of the clutch assembly mount 212 to help decelerate the flywheel 508 and its weight 506.

Although it is not required, the foregoing arrangement is beneficial because it provides control over the clutch assembly 100 without requiring significant effort to engage and disengage the working parts. In particular, the disengagement lever 502 obtains a significant mechanical advantage to press against the biasing force of the spring 622, which provides a simple arrangement that facilitates easy disengagement of the clutch assembly 100, either by hand or by a suitable mechanical or electrical device. Furthermore, as discussed in more detail below, it may not be necessary for the frictional forces between the flywheel 508 and drum 608 to be particularly great in order to engage the clutch assembly 100, and therefore the spring 622 need not have a particularly high biasing force. This also reduces the amount of force necessary to move the disengagement lever 502 and eases the requirements to operate the system.

It will be readily appreciated that various modifications or changes may be made to the clutch assembly 100 to provide for engagement and disengagement. For example, the solenoid 210 may be replaced by a hand-operated lever, and the disengagement lever 502 may be replaced with other structures that move the flywheel 508 out of engagement. In still other embodiments, the clutch assembly 100 may be biased in the disengaged position, and require input to engage it, or the clutch assembly 100 may not be biased in either the engaged or disengaged position.

FIG. 6 is an exploded view of the clutch assembly 100 and FIG. 7 is a cut-away view of the internal components of the clutch assembly 100. As best seen in FIG. 7, a shaft 602, such as a steel axle, runs the length of the clutch assembly 100, and is used to transfer torque from the clutch input gear 130 to the clutch output gear 140. Certain parts of the clutch assembly 100 may be fixed to rotated with the shaft 602. For example, in accordance with the first embodiment, an overload cog 616 (described below) and the clutch output gear 140 are fixed to the shaft 602. Parts that are fixed to the shaft 602 may be secured using any suitable method. For example, the overload cog 616 and clutch output gear 140 may be secured by pins that pass through corresponding holes through the shaft 602. Other forms of mounting may include press-fitment, threads, keys, and eccentric mating shapes (such as a D-shaped shaft and corresponding D-shaped holes through the fixed parts). Other parts may be fixed to the shaft 602, as well. For example, in this first exemplary embodiment, the end bearing 604a may be pressed onto the end of the shaft 602 to capture parts in place between the bearing 604a and the overload cog 616.

As noted above, the shaft 602 is rotatably mounted by two bearings 604a, 604d. Additional bearings may be used to support the shaft 602, and to rotatably mount other parts on the shaft 602. For example, in an exemplary embodiment, at least six bearings, 604a, 604b, 604c, 604d, 604e, and 604f may be provided. In addition, the bearings 604a-f may be plain roller or ball bearings, but may be replaced by other kinds of rotating mounts, such as bushings or journal bearings. In this first embodiment, the bearings 604a-f may be the same type, but different types of bearings or rotating mounts may be mixed together. The rotating mounts may allow some axial movement of the parts they support, but they alternatively may hold the supported part in a fixed axial location along the shaft 602. The bearings 604 preferably are sealed, durable and last for the life of the vacuum cleaner, but they may require periodic maintenance.

Figure 8:
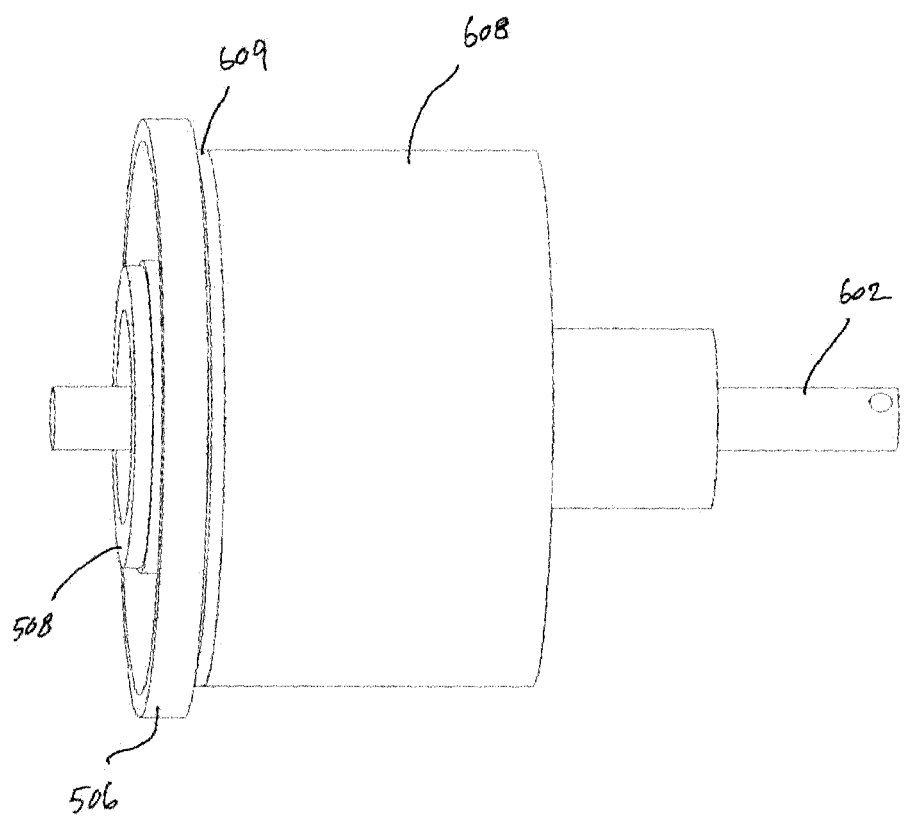
FIG. 8 is a perspective view of a flywheel and drum assembly of the clutch assembly of FIG. 2.

As noted above, the clutch assembly 100 of the exemplary first embodiment provides a selective clutch function and an overload cutoff function. The clutch assembly 100 may be arranged such that clutch mechanism and overload mechanism are located together within the confines a single structural component. Such an arrangement may provide a relatively compact structure, enabling installation in a space-constrained environment, such as the base assembly 110 of a vacuum cleaner, as described above. For example, a single cylindrical module located generally within the clutch input gear 130 may contain the clutch and overload mechanisms. As shown in FIGS. 6-8, this module may comprise a drum 608 with a drum lid 609. It should be appreciated that in other embodiments, the clutch mechanism and/or the overload mechanism may be located in a more linear arrangement, such that the components of the clutch assembly are spaced out over the length of the shaft, and it is not required to contain the clutch and overload mechanisms in a common unit like the drum 608.

In the present exemplary embodiment, the drum 608 comprises a generally cylindrical structure that is open at one end, and closed at the other. The drum 608 is rotatably mounted to the shaft 602 by one or more bearings or bushings, such as the shown two bearings 604b and 604c. Such rotating mounts may be spaced apart to help distribute any loads on the drum 608 that may be caused by belt tension or other factors. The drum lid 609 covers the end of the drum 608 to contain the internal clutch and overload mechanisms. The clutch input gear 130 surrounds the drum 608, and is rigidly fixed thereto by any suitable means, such as adhesives, press fitment, locking parts or other fasteners. The clutch input gear 130 also may be formed integrally with the drum 608. In the exemplary embodiment, the clutch input gear 130 or drum 608 may include vents 611 that help dissipate the heat that may develop in the drum 608. As explained below, the drum lid 609 may provide a frictional contact point for the flywheel weight 506. Thus, the drum lid 609 and flywheel weight 506 may be formed of heat-resistant materials, such as metal or heat-resistant plastic.

The clutch and overload mechanisms may be contained within the drum. In one embodiment, the clutch mechanism may generally surround the overload mechanism, although it should be appreciated that the overload mechanism may merely be within the confines of the clutch mechanism or alternatively located co-incidentally with or adjacent to the clutch mechanism. For example, the overload mechanism may be between the clutch input gear 130 and the clutch output gear 140. The overload mechanism also may be located remotely from the clutch mechanism in other embodiments.

Any suitable drive clutch mechanism may be used to selectively transfer torque from the clutch input gear 130 to the clutch output gear 140 (assuming the overload mechanism is not preventing such transfer). For example, the drive clutch mechanism may comprise a single stage clutch that essentially immediately transfers all torque from the clutch input gear 130 to the clutch output gear 140 (e.g., a simple "dog" clutch having parts that physically interlock to transfer torque). Alternatively, the drive clutch mechanism may comprise a graduated engagement clutch that transfers torque from the clutch input gear 130 to the clutch output gear 140 gradually or in blended or discrete stages. A simple graduated engagement clutch might comprise, for example, a disk clutch like those used in typical automotive applications, which, depending on the speed with which it is engaged, can smoothly increase the torque over time. Another graduated engagement clutch may comprise one having multiple clutches. For example, a first clutch may provide an initial rotational energy and/or initial transfer of torque from the clutch input gear 130 to the clutch output gear 140, and a second clutch may be engaged after the first clutch to provide increased torque transfer. Arrangements that provide a significantly graduated torque transfer may be referred to as a "soft-start" drive clutch system. Examples of such devices are described below, but other embodiments may use other types of clutch mechanism.

As stated above, an overload mechanism may be provided to terminate torque transfer. Such a mechanism may operate in conjunction with or independently from a clutch mechanism. For example, the overload mechanism may be an overload clutch that decouples the clutch output gear from the clutch mechanism when an excessive resistance torque is applied to the clutch output gear. The overload clutch may be a resistance clutch, such as one that uses friction devices and/or magnetic forces, or any other suitable clutch device. The presently-discussed exemplary embodiment provides clutch and overload mechanisms, which are described together below, but may be used independently in other embodiments.

In the first exemplary embodiment, a drive clutch mechanism may include an expanding clutch 610, a clutch lever 612, a clutch mount 614, and an overload spring 618. In the shown embodiment, all of the foregoing parts are located within the drum 608, but this is not required. The flywheel 508 operates the clutch lever 612, as described below. The clutch mount 614 is located within the circumference of the expanding clutch 610 and rotatably mounted on the shaft 602 by a bearing 604e or bushing. The clutch mount 614 provides a stable mounting plane for the expanding clutch 610, the clutch lever 612 and the overload spring 618. As shown, the expanding clutch 610 may surround the clutch mount 614, while the clutch lever 612 and overload spring 618 are mounted to opposite faces of the clutch mount 614.

The clutch lever 612 is pivotally connected to the clutch mount 614, such as by a pivot pin 624. The expanding clutch 610 comprises a generally C-shaped structure that is mounted at one end to the clutch mount 614 by a first pin 626, and at the other end to the clutch lever 612 by a second pin 628. Rotation of the clutch lever 612 about its mounting pin 624 transmits a force to the second pin 628 that tends to increase the size of the opening in the C-shaped expanding clutch 610, which increases the diameter of the expanding clutch 610. The first and second pins 626, 628 may be mounted in slots on the expanding clutch 610 to allow some radial movement as the expanding clutch 610 expands and contracts and accommodate any wear the parts might experience. Such slots may also provide a ramp-like structure against which the pins 626, 628 can press to generate an outward (or inward) radial component to the opening force applied by the clutch lever 612.

In the exemplary embodiment, the clutch lever 612 is operated by the flywheel 508. As noted above, the flywheel 508 is biased by a spring 622 into engagement with the end of the drum 608. Contact may be directly between the flywheel 508 and drum 608, or via one or more added parts, such as shown. The flywheel 508 is rotatably mounted on the shaft 602 by a bearing 604*f* (FIG. 7), and can rotate on the shaft 602 independently from the drum 608. When the clutch is in the engaged position, which is the default position in this embodiment, the flywheel 508 contacts the drum 608. In this position, rotation imparted to the drum 608 (via the clutch input gear 130) tends to rotate the flywheel 508 by frictional contact between these parts. If the flywheels' resistance to rotation is great enough, the frictional contact will be insufficient to drive the flywheel 508 at the same speed as the drum 608, or, in some cases, to drive the flywheel 508 at all. Conversely, where the flywheel 508 has relatively little resistance to rotation, it may rotate at the same speed as the drum 608. Friction and inertia can both contribute to the flywheel's resistance to rotation at any given moment, and the weight of the flywheel 508 (and any parts that it drives) may be modified to provide an initial resistance to rotation (as well as a resistance to sudden changes in the rotational speed during operation) due to the inertia of the parts.

Figure 9:
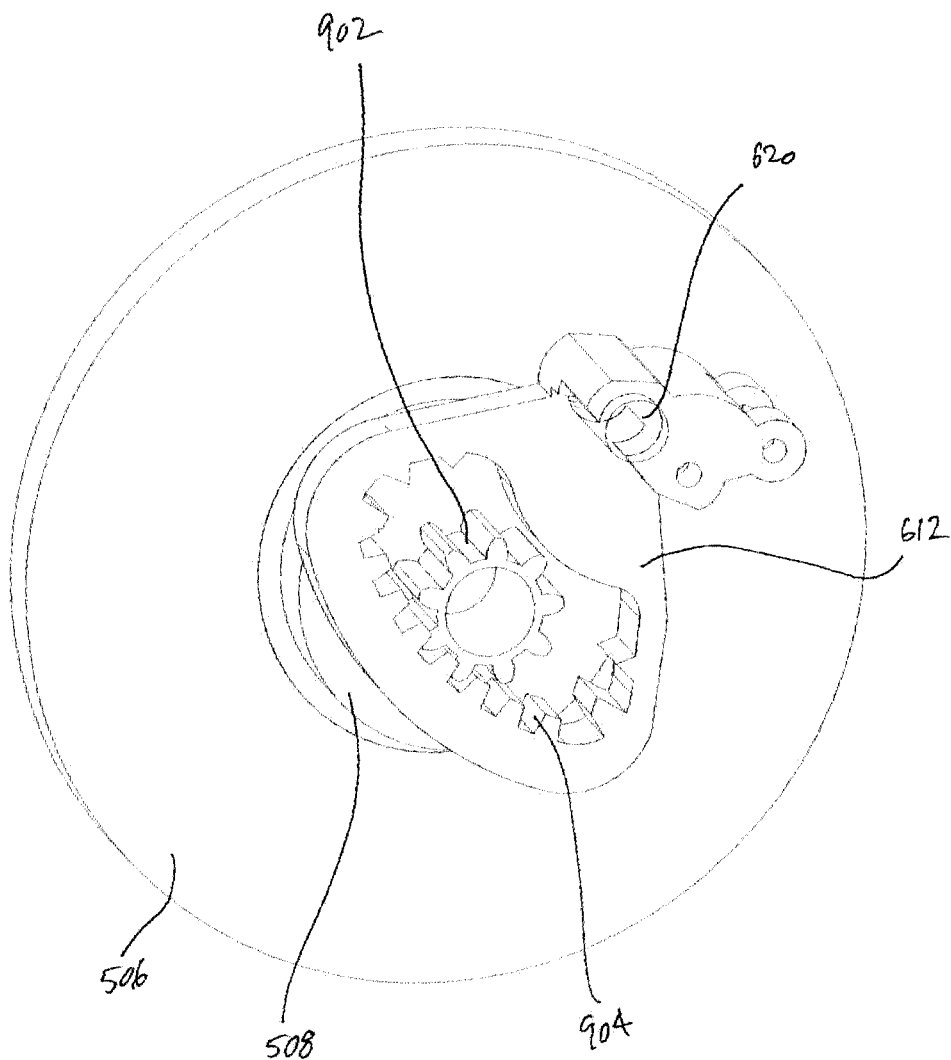
FIG. 9 is a perspective view of a clutch lever of the clutch assembly of FIG. 2.
Figure 10A:
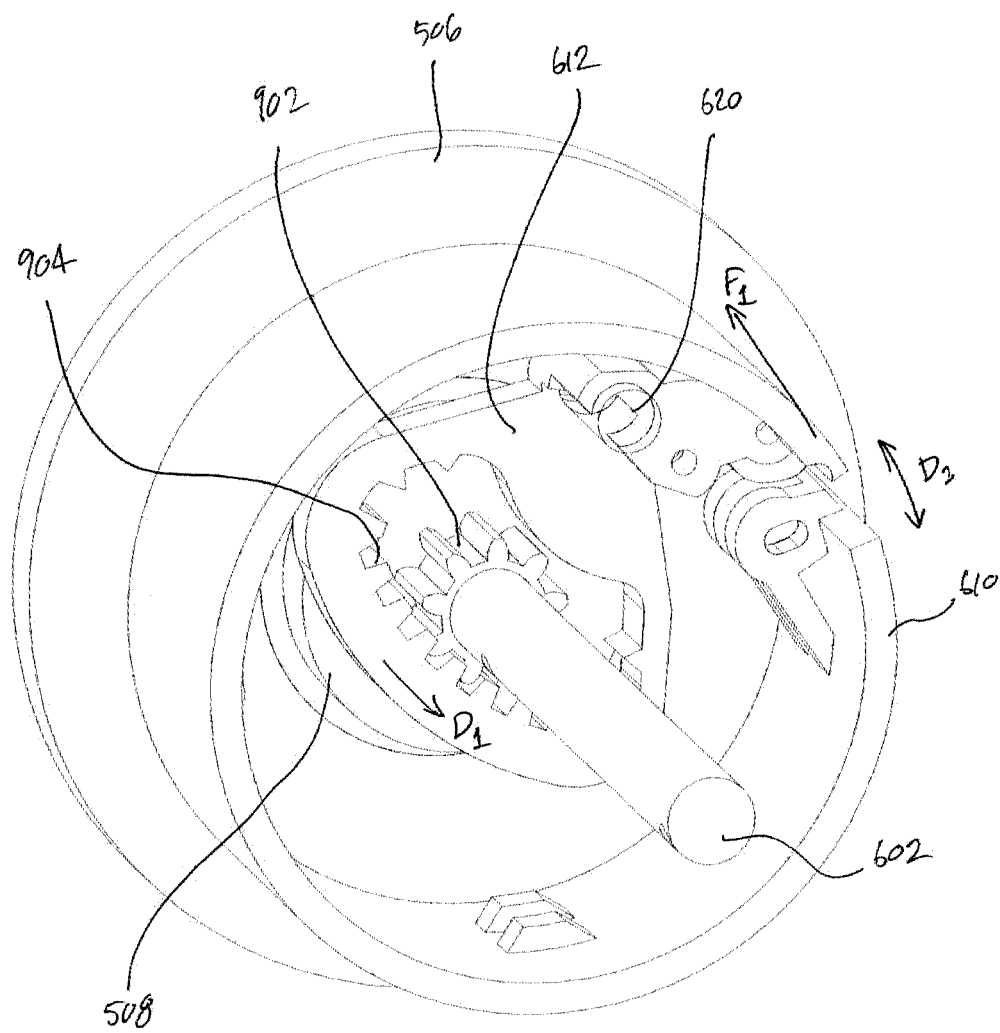
FIG. 10A is a perspective view of an expanding clutch assembly of the clutch assembly of FIG. 2.

As best shown in FIGS. 9 and 10A, the flywheel 508 includes a flywheel gear 902 that fits into a corresponding geared track 904 located in a cavity on the clutch lever 612. FIG. 10A shows the clutch lever 612 and the expanding clutch 610 with the clutch mount 614 removed. The flywheel 508 and its gear 902 rotate in a generally counter-clockwise direction in the views of FIGS. 9 and 10A. Rotation of the flywheel 508 and its gear 902 tends to pivot the clutch lever 612 about its pin 624, as indicated by arrow D1. This pivoting torque applies a force F1 against the expanding clutch 610 that tends to opens the expanding clutch 610, as indicated by arrow D2. As the clutch 610 expands, its diameter increases, eventually causing the expanding clutch 610 to contract and exert pressure against the interior wall of the drum 608. The length of the geared track 904 is selected such that the expanding clutch 610 contacts the inner wall of the drum 608 before the flywheel gear 902 reaches the end of the track 904.

It will be appreciated that the expanding clutch 610 may, because of the resilient nature of the material from which it is made (plastic, for example), provide some resistance to being expanded (this is referred to herein as the expansion resistance). If the expansion resistance is great enough, the torque applied by the flywheel gear 902 to the geared track 904 may not generate a sufficient expansion force F1 to expand the expanding clutch 610 into contact with the drum 608. In other instances, the expansion resistance may be very low, so that virtually no substantial amount of torque is required to expand the expanding clutch 610. For example, the flywheel gear 902 may be able to expand the expanding clutch 610 by applying about 1/100th of the total amount of torque that the clutch transfers.

It will also be appreciated that the magnitude of the expansion force F1 may be limited if the clutch mount 614 begins to rotate. This situation may occur if the inertia and frictional resistance of the clutch mount 614 (the clutch mount's "resistance torque") is relatively low. The clutch mount's resistance torque will depend on its inertia and rotating friction, as well as the inertia and rotating friction of any parts to which it is attached. As explained below, the clutch mount 614 is normally attached to the brushroll 102 and various other parts, all of which increase the clutch mount's resistance torque by inertia and any friction between these parts and their surroundings (such as contact between the brushroll 102 and a surface to be cleaned) or between these parts and each other (such as friction in a bearing). If the clutch mount's resistance torque is low enough, the torque applied by the flywheel gear 902 to the clutch lever 612 may begin to rotate the clutch mount 614 before the expanding clutch expands to contact the inner wall of the drum 608. In such a case, the amount of torque that can be transmitted to the clutch mount 614 is limited by the frictional contact between the drum 608 and the flywheel 508.

Where the expansion resistance of the expanding clutch 610 is low enough, and the resistance torque of the clutch mount 614 is high enough, the flywheel gear 902 will rotate the clutch lever 612 and expand the expanding clutch 610 as described above. Contact and pressure between the expanding clutch 610 and the drum 608 generate friction, and transmits torque directly from the drum 608 to the expanding clutch 610. In the shown embodiment, the amount of leverage that the clutch lever 612 applies to expand the expanding clutch 610 (and the amount of force applied to press the expanding clutch 610 into contact with the drum 608) increases as the clutch mount's 614 resistance to rotation increases. This is because the clutch lever pivots on mounting pin 624, which is installed in the clutch mount 614, and forces that resist rotation of the clutch mount 614 are transmitted through the mounting pin 624 in a manner that is favorable to amplify the expanding force. The use of this feature allows the expanding clutch 610 to be engaged with relatively force and react quickly to fluctuations in the drive resistance. Thus, it can be said that the shown expanding clutch 610 is a self-adjusting clutch that increases the transmitted torque as rotational resistance of the load (i.e., the clutch mount 614 and everything driven by it) increases. Since the rotational resistance of the clutch mount 614 is a function of both friction and inertia, the self-adjusting expanding clutch 610 will tend to expand and transmit greater torque whenever the load encounters greater friction (e.g., when the brushroll 102 contacts a thick carpet), and whenever there is a high differential inertia between the parts (e.g., when the brushroll 102 is still or rotating relatively slowly). Conversely, if the load experiences a condition in which it tends to overrun the expanding clutch 610—such as when power to the motor 104 is terminated and the brushroll 102 continues to rotate by inertia—the self-adjusting expanding clutch 610 may release engagement with the drum 608 and transmit little or no torque to the load. In addition, the rate at which the brushroll 102 can accelerate (either during startup of during speed fluctuations, may be limited by the rate at which the flywheel 508 can accelerate via its contact with the drum 608. In one embodiment, the expanding clutch 610 may be self-adjusting to the point that it is self-locking, so that no amount of drive resistance can overcome the friction generated between the expanding clutch 610 and the drum 608.

Figure 10B:
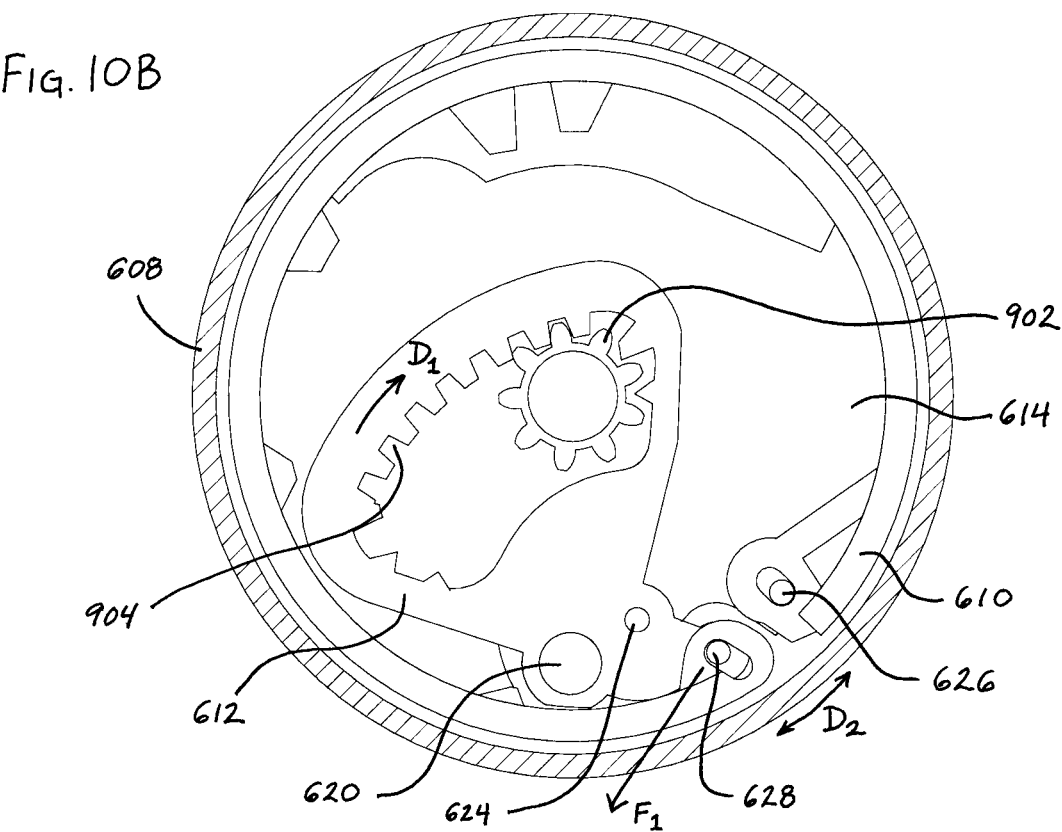
FIG. 10B is a schematic end view of the expanding clutch assembly of FIG. 10A, showing the expanding clutch in a disengaged position.
Figure 10C:
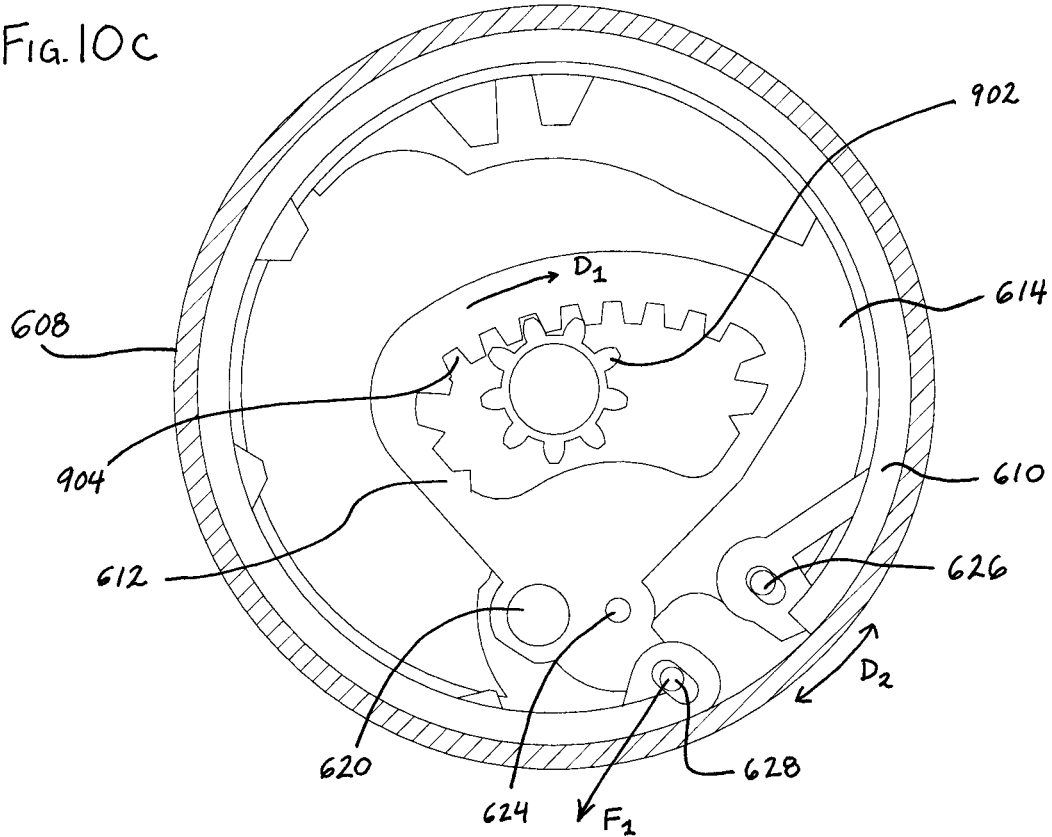
FIG. 10C is a schematic end view of the expanding clutch assembly of FIG. 10A, showing the expanding clutch in an engaged position.

The operation of the expanding clutch 610 in this manner is illustrated in FIGS. 10B and 10C, which show the expanding clutch 610 in the disengaged and engaged position, respectively. These figures are shown from the opposite side as FIG. 10A, and thus the rotations are reversed in these views. As will be appreciated, it may be desirable to use lubricants, such as natural or synthetic oils or greases, lubricated coatings or layers, or low-friction/low-wear materials, on the expanding clutch 610, flywheel 508, as well as any other parts that engage in frictional contact, to help prevent excessive wear.

The exemplary drive clutch mechanism may be disengaged by operating the solenoid 201 or other disengagement mechanism. The solenoid 201 or other disengagement mechanism may have a manual control to allow the user to engage and disengage the drive clutch at will. The solenoid 201 or other disengagement mechanism also may have an automatic control that engages and disengages the drive clutch during particular circumstances, such as when the upper portion of an upright vacuum cleaner is pivoted to the upright parked position, or when a bare floor cleaning mode is selected on a vacuum cleaner. Such an automatic device might comprise, for example, a micro-switch that activates the solenoid 201, or a mechanical override mechanism (such as a cam or pushrod) that presses against the lever 502, when the vacuum cleaner housing is moved to the upright position. As noted above, the solenoid shaft 504 presses the disengagement lever 502, which rotates on its pivots 503 and moves the flywheel 508 out of contact with the drum 608. When the flywheel 508 is disengaged from the drum 608, it no longer applies a torque to the flywheel gear 902. When this happens, expanding clutch's expansion resistance tends to contact the expanding clutch 610 and pull it away from contact with the drum 608. In addition, a weight 620 may be provided on the clutch lever 612 to assist with disengaging the expanding clutch 610. The weight 620 is located on the clutch lever 612 where centrifugal force presses the weight 620 opposite the rotation imparted by the flywheel gear 902. As a result, the weight 620 resists engagement of the expanding clutch 610, and causes the clutch lever 612 to retract to the disengaged position once the torque from the flywheel gear 902 is terminated. Having terminated frictional contact between the flywheel 508 and the drum 608 and the expanding clutch 610 and the drum 608, torque is no longer transmitted through the clutch assembly 100 to the clutch output gear 140. Thus, the shaft 602 and brushroll 102 may decelerate and eventually stop rotating. Even when the drive clutch is disengaged, however, the clutch input gear 130 and the drum 608 may continue to rotate for as long as the motor 104 operates. It will be appreciated that the weight 620 may, in other embodiments, be omitted, relocated or replaced by other mechanisms, such as a spring that tends to pivot the clutch lever 612 against the force applied by the flywheel gear 902.

In the exemplary embodiment, the expanding clutch 610 is able to transmit significantly more torque between the drum 608 and the clutch mount 614 than the frictional contact between the flywheel 508 and drum 608. This difference in torque capacity may be attributed to the size of the contacting surfaces, as well as the mechanical design of the parts. For example, the expanding clutch operates as a drum-type clutch and has a relatively large contact area, whereas the flywheel-to-drum contact surfaces operate as a disk clutch having a relatively small contact area. Thus, the present exemplary embodiment provides a two-clutch system. Under normal conditions, the first clutch (the flywheel/drum system) may have insufficient torque transferring capability to operate the brushroll 102, and is instead used to engage the expanding clutch 610 in a controlled manner. Alternatively, if the system is modified accordingly, the first clutch may be able to operate the brushroll 102 under relatively low load conditions. If desired, the shapes, sizes and kinds of these two clutch systems may be modified to obtain different differences in their torque transferring capabilities. For example, the frictional contact between the drum 608 and flywheel 508 may be modified by adjusting the force applied by the spring 622 or changing the coefficient of friction between the parts. Changing the weight of the flywheel weight 506 can also adjust how quickly the flywheel accelerates in response to contact with the drum 608. Similar adjustments may be made to the expanding clutch 610. For example, the pins 626, 628 used to expand the expanding clutch 610 may be positioned in angled slots that apply a radial force to increase frictional contact with the drum 608, or the shape of the clutch lever 612 may be modified to apply more or less leverage to expand the expanding clutch 610. Other modifications will be understood by persons of ordinary skill in the art in view of the present disclosure.

The configuration of clutches in the foregoing embodiment has been found to provide a relatively smooth transfer of torque from the motor output gear 120 to the brushroll 102. This smooth transfer of torque lessens the maximum torque differential between the motor output gear 120 and brushroll 102. This is particularly the case when comparing the foregoing embodiment to direct-drive devices that drive the brushroll 102 directly by the motor output gear 120 through a belt. Such direct-drive devices, which are in widespread use, typically use motors that generate their maximum torque at zero revolutions per minute. This, combined with the fact that the brushroll is not rotating at startup and may have frictional resistance to rotation, leads to a relatively high torque differential between the motor and the brushroll that must be conveyed through the driveline. While the overload mechanism described above or elsewhere herein can be modified to accommodate this high torque, it may take a sufficiently high differential torque to disengage the overload mechanism. This may be suitable in some instances, such as where the motor has relatively low power, but may not be suitable in other instances. Thus, a clutch engagement mechanism such as the one described above, which reduces the maximum torque differential that can be transmitted across the overload mechanism by providing a relatively low-torque or graduated-torque "soft" start, may be used in conjunction with an overload mechanism that will disengage if a relatively low torque differential is applied to it.

Figure 11:
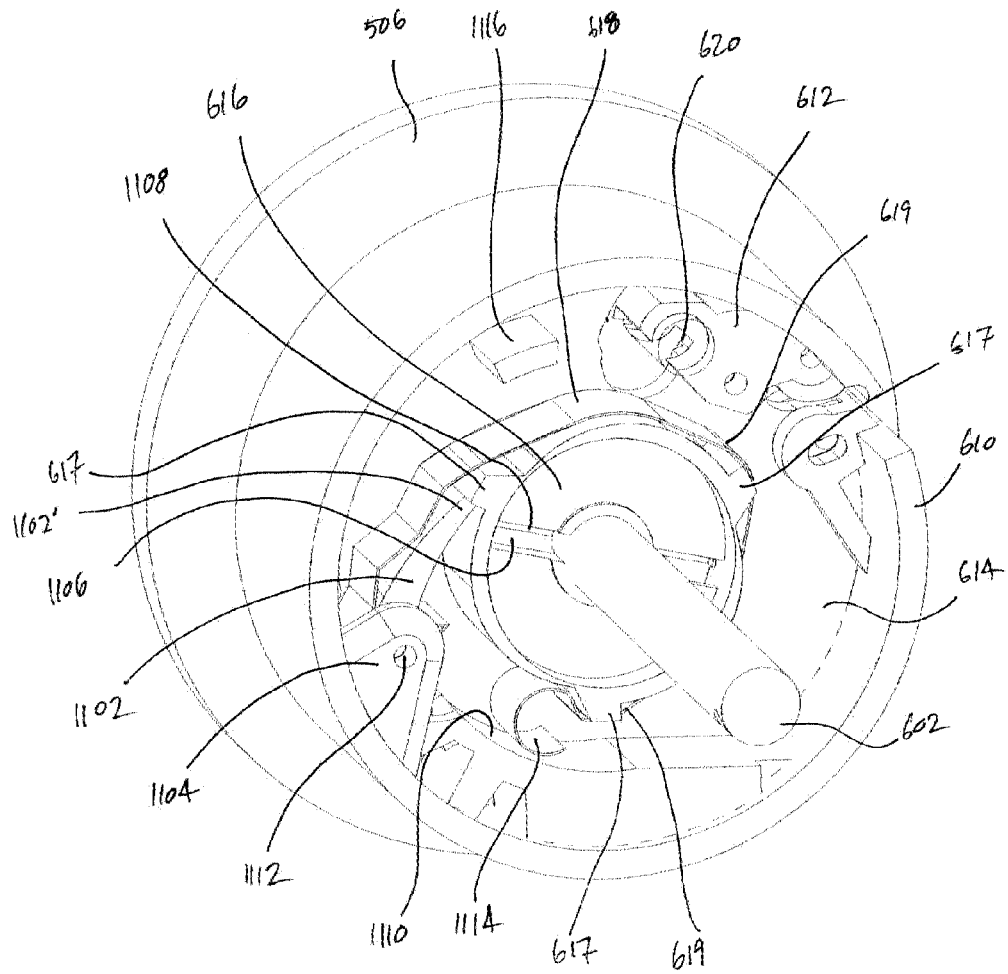
FIG. 11 is a perspective view of an inner overload device of the clutch assembly of FIG. 2, showing the device in a normal operating condition.
Figure 12:
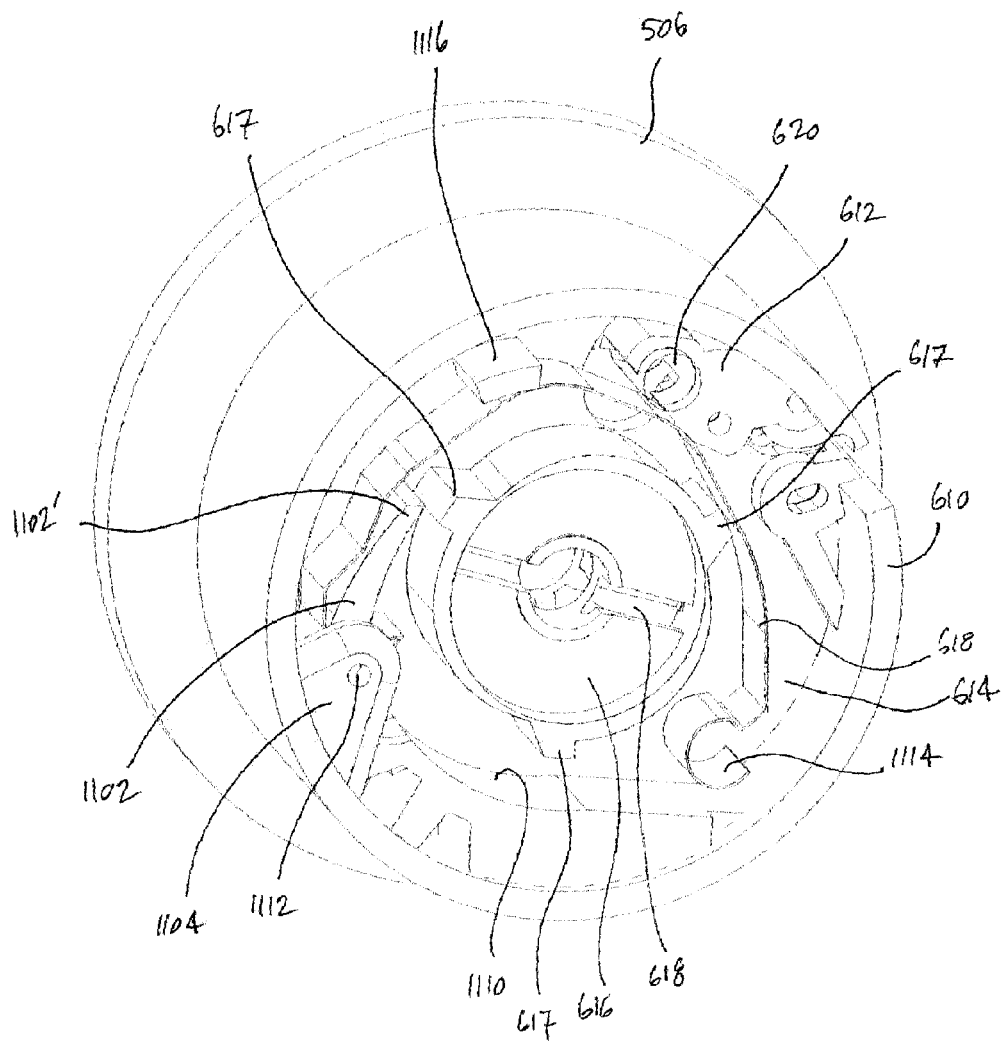
FIG. 12 is a perspective view of an inner overload device of FIG. 11, showing the device in the overload condition.

As noted above, torque transmitted to the clutch mount 614 may be conveyed to the brushroll 102 via an overload mechanism. The overload mechanism terminates the transfer of torque from the motor output gear 120 to the brushroll 102 when an excessive amount of torque is applied to the overload mechanism. Referring to FIGS. 11 and 12, in the present embodiment, the overload mechanism may include an overload cog 616 and an overload spring 618.

The overload spring is connected to the clutch mount 614 on the side opposite the clutch lever 612. Thus, in this embodiment, the clutch mount 614 also acts as an overload spring mount. As shown, the overload spring may be attached at a mounting bracket 1104. As shown, the overload spring 618 may be wrapped around a pin 1112 that passes through the bracket 1104, and allows the overload spring 618 to pivot if not otherwise constrained from moving. In other embodiments, other mounting methods may be used. For example, an end of the overload spring 618 may be pressed into a groove or channel on the surface of the clutch mount 614, providing a rigid connection point, but still allowing the overload spring 618 to flex during normal operation of the clutch and in overload conditions, as described below. The overload spring 618 may be made from hardened steel or any suitable alternative material. The shape of the overload spring 618 may be modified to avoid sharp bends that might stretch over time or create weak points in the material structure.

The overload spring 618 wraps around the overload cog 616 and is shaped to transfer torque from the clutch mount 614 to the overload cog 616 to thereby rotate the overload cog 616. The overload cog 616 is rigidly mounted to the shaft 602, and directly transfers torque and rotation to the clutch output gear 140, which is also rigidly mounted to the shaft 602. The overload cog 616 may be rigidly mounted to the shaft 602 by any suitable structure. For example, as shown in a pin 1106 may pass through the shaft of 602 and engage a slot 1108 on the face of the overload cog 616. In the shown exemplary embodiment, the overload cog 616 is not connected only to the shaft 602 and clutch output gear 140, but in other embodiments it may be attached to one or more other parts.

The exemplary overload cog 616 is generally circular and has a series of teeth 617 or other protrusions that extending radially outward. In accordance with an exemplary embodiment, the overload cog 616 may have three teeth 617. The overload spring 618 is shaped similarly to the overload cog 616, so that it engages the teeth 617 to transfer of torque through the overload cog 616 to the shaft 602. For example, in the shown embodiment, the overload spring 618 has a generally circular shape with rounded lobes 619 that fit over the teeth 617 when the overload spring 618 and overload cog 616 are in certain orientations with respect to one another. Stated differently, the overload cog 616 has first portions that extend a first distance from its rotating axis (e.g., the circular portions), and second portions that extend a second distance from the rotating axis (e.g., the teeth 617), and the overload spring 618 is configured to wrap around the overload cog 616 and have first portions that conform generally to the first portions of the overload cog 616, and second portions that conform generally to the second portions of the overload cog 616. While it could be possible to have the overload spring 618 conform more precisely to the shape of the overload cog 616, it has been found that it is not necessary to make these two parts match precisely, and doing so might, in some circumstances, create undesirable stress risers in the parts.

In normal operation the overload spring 618 is wrapped around the overload cog 616, and the rounded lobes 619 fit over the teeth 617. When a torque is applied to rotate the clutch mount 614 (such rotation is counterclockwise in FIGS. 11 and 12), the clutch mount 614 pulls the overload spring 618 (via pin 1112) to rotate in unison with the clutch mount 614. Contact between the overload spring 618 and overload cog 616 transmits the drive torque to, and thereby rotates, the overload cog 616. The overload spring's 618 spring tension (i.e., its resistance to deformation) maintains the overload spring's 618 contact with the overload cog 616 in the shown engaged, torque-transferring orientation. The parts will remain in this orientation with respect to one another and continue to rotate together until the drive torque transmitted through the clutch mount 614 is terminated, or the overload cog 616 encounters sufficient rotational resistance (resistance torque) that the overload spring 618 disengages from the overload cog 616. Such resistance torque can be generated, for example, if the brushroll 102 encounters high resistance to rotation or is prevented from rotating, as may occur if a foreign object becomes entangled in the brushroll. The amount of torque that can be transmitted from the overload spring 618 to the overload cog 616 is referred to herein as the overload clutch's torque rating.

The overload clutch's torque rating may be determined primarily by the shapes of the parts and the spring's resistance to deformation. For example, if the overload cog 616 has relatively angular teeth 617 and the lobes 619 on the overload spring 618 conform closely to the teeth 617, the mechanical engagement between the two may require transfer relatively more torque than if softly rounded teeth 617 or loosely-conforming lobes 619 are used. Also, if the overload spring 618 is made from a more resilient or thinner material, the torque rating of the overload clutch may be reduced. In addition, other embodiments may use other shapes to provide releasable engagement between the overload cog 616 and the overload spring 618. For example, the overload cog 616 may have depressions into which inwardly-extending lobes on the overload spring 618 fit to provide releasable, torque-transferring engagement between these parts. In other embodiments, the overload spring 618 may be located within a hollow overload cog 616, and in still other embodiments, the overload spring 618 may be mounted to the shaft 602 to rotate therewith, and the overload cog 616 may be mounted to the clutch mount 614 to rotate therewith. These and other variations will be apparent from the present disclosure, and a person of ordinary skill in the art will be able to develop appropriate configurations and dimensions for these parts in view of the present disclosure without undue experimentation.

When the overload clutch's torque rating is exceeded, the overload spring 618 will continue to rotate with the clutch mount 614, but the overload cog 616 will either stop or rotate at a different, slower speed. In such circumstances, the lobes 619 disengage from the teeth 617, and the portions of the overload spring 618 between the lobes 619 will move into contact with the teeth 617. When this occurs, the overload spring 618 is deformed and generally increases in diameter to pass over the teeth 617. In this state, the overload spring 618 may still tend to wrap around and contact the overload cog 616, in which case these two parts will have insubstantial contact one another during overload conditions, and such contact would not be sufficient to generate a torque that could damage the agitator or objects that it might contact. For example, such contact might be sufficient to rotate the agitator when it is lifted free of the surface being cleaned and otherwise not obstructed, but not to rotate the agitator if it is lightly contacted by the user's fingers. This may be desirable because contact between the parts may provide an audible sound to signal the operator that an overload has occurred. Under this scenario, the overload spring 618 may optionally also be able to reengage the overload clutch 616 if the resistance torque decreases. For example, the operator may momentarily pass the vacuum cleaner brushroll 102 over an object (such as frayed strand from a carpet) that generates sufficient resistance to exceed the torque rating and disengage the overload spring 618, but then pull the brushroll 102 free of the object to reduce the rotating resistance, at which time the overload spring 618 may reengage the overload cog.

While the foregoing arrangement is possible, in other embodiments it may be desirable to prevent the overload spring 618 from reengaging the overload cog 616 until the user terminates drive to the overload clutch. For example, preventing automatic reengagement of the overload clutch may be desirable to limit the likelihood that the operator will be surprised by a sudden resumption in the brushroll's operation, and it may be desirable to prevent the overload spring 618 from wearing on the overload cog 616 during overload. In the shown exemplary embodiment, a mechanism may be provided to help hold the overload spring 618 away from the overload cog 616 during overload conditions. For example, centrifugal force may be used to hold the overload spring 618 away from the overload cog 616 until the clutch mount 614 stops rotating or slows significantly. To further help prevent automatic reengagement, the expanding clutch 610 may remain pressed against the drum 608 even after the overload clutch disengages, to provide a high torque differential that can not be overcome until the parts come to rest or otherwise match speeds.

As noted above, during overload conditions, the overload spring 618 disengages from the overload cog 616. When this occurs, overload spring 618 is free to pivot away from the overload cog 616, and centrifugal force will tend to expand the overload spring 618 radially outward and away from the overload cog 616, such as shown in FIG. 12. The overload spring 618 may be weighted or have sufficient weight of its own that centrifugal force holds the overload spring 618 in the disengaged position. In addition a pawl 1102 may be pivotally mounted to the clutch mount 614, such as at the mounting bracket 1104, to contribute its weight (and resulting centrifugal force) to help press the overload spring 618 in the expanded, disengaged position. The pawl 1102 may be mounted on the same bracket 1104 as the overload spring 618, or elsewhere. In the shown embodiment, the pawl 1104 may be pivotally mounted to the bracket 1104 by the pin 1112, and the end of the overload spring 618 may tightly wrap around the pivoting end of the pawl 1102 to thereby pivotally mount the overload spring 618 to the clutch mount 614.

It will be appreciated that other additional weights or springs may be used to help hold the overload spring 618 in the disengaged position. For example, a weight may be provided along the length or at the free end of the overload spring 618. As another example, a weight that slides on a sliding radial track may be positioned inward of a portion of the overload spring 618 to apply centrifugal force to the overload spring 618. A helper spring may also be provided to press the overload spring 618 outward. A helper spring may also be provided to press the overload spring 618 inward, if it is not desired to fully disengage the overload spring 618 during overload conditions.

As shown in FIG. 12, during overload conditions, the overload spring 618 is pressed radially outward by its own weight and the weight of the pawl 1102. One or more walls or other blocking structures 1116 may be located on the clutch mount 614 to control the outward movement of the overload spring 618. Such blocking structures 1116 may also provide a fulcrum point that cooperates with centrifugal force on the overload spring 618 to bend the overload spring 618 so that it clears the overload cog 616.

As shown in FIG. 11, the pawl 1102 may also (or alternatively) be provided to act as a back brake that prevents the overload cog 616 from rotating faster than the clutch mount 614. In this exemplary embodiment, during normal (i.e., non-overload) operating conditions, the pawl 1102 is pivoted so that its free end 1102' engages one of the overload cog teeth 617. The free end 1102' of the pawl 1102 and the cog teeth 617 are shaped such that the teeth 617 can not rotate past the pawl 1102. Thus, the pawl 1102 prevents the overload cog 616 from rotating faster than the clutch mount 614.

Such a configuration may be desirable to prevent the brushroll 102 from continuing to rotate even after the motor 104 has been turned off, or from rotating faster than the motor 104 during normal operation when the brushroll 102 experiences a momentary drop in rotating resistance or is accelerated by elastic tension developed in the brushroll belt 108. For example, in the exemplary embodiment, when the motor 104 is turned off when the drive and overload clutches are still engaged, the brushroll 102 may tend, due to its rotating inertia, to continue rotating. Without the pawl 1102 or other back brake, the brushroll's inertia may be transmitted to the overload spring 618 through the overload cog 616, possibly disengaging the overload clutch and allowing the brushroll 102 to continue spinning. With the exemplary back brake, however, the pawl 1102 transmits forces caused by rotating inertia directly to the clutch mount 614 and back through the drive clutch. If the inertial forces are great enough, the brushroll 102 may force the drive clutch to overrun the motor, but friction between the drive clutch elements, such as between the drum 608 and flywheel 508 will rapidly dissipate this energy. While the pawl 1102 is shown as one exemplary embodiment, other back brake or overrun prevention mechanisms may be used instead of the pawl 1102; for example, the pawl 1102 may be formed by an extension of the overload spring 618 that is folded back to face the overload cog teeth 617.

Other features may be provided in various embodiments to increase the torque rating of the overload clutch. For example, the free end of the overload spring 618 (i.e., the end opposite the end that is connected to the clutch mount 614) may include a curled end 1114, such as the shown circular knob, that fits between the overload cog 616 and a wall portion 1110 formed on the clutch mount 614. The curled end 1114 is large enough that it can not fit between the wall portion 1110 and the overload cog teeth 617 unless it is deformed, but small enough that it can freely fit between the remainder of the overload cog 616 and the wall 1110 without being deformed. During normal operation (i.e., when the overload clutch is engaged), the curled end 1114 fits between the wall portion 1110 and the overload cog 616. In this embodiment, the overload spring 618 will continue to transmit torque to the overload cog 616 until there is sufficient resistance to compress the curled end 1114 so that it can pass between the clutch mount wall 1110 and the adjacent overload cog tooth 617. The curled end 1114 preferably is generally circular to distribute the compression force across the material and resist permanent deformations, but it may be V-shaped or have other shapes. Once disengaged, the overload spring 618 is pressed by centrifugal force away from the overload cog 616. Once the clutch mount 614 substantially stops rotating, the overload spring 618 returns to its contracted position against the overload cog 616. Once this happens, the curled end 1114 will be reseated between the wall 1110 and the overload cog 616 as the two parts rotate relative to one another just prior to reengaging. Thus, the shown exemplary embodiment prevents reengagement of the overload spring 618 and overload cog 616 until the clutch mount 614 and overload cog 616 substantially stop rotating.

When used with the drive clutch mechanism of FIGS. 6-10C, the foregoing overload clutch may automatically disengage the expanding clutch 610 when the overload clutch enters the overload state shown in FIG. 12. When the overload spring 618 disengages from the overload cog 616, clutch mount 614 can freely rotate and may provide little resistance to the torque provided by the flywheel gear 902. Under these conditions, the clutch lever pin 624 may no longer provide a fulcrum point through which the flywheel gear 902 can generate force to expand the overload clutch 610. When this happens, the expansion resistance of the expanding clutch 610 (and the clutch lever weight 620, if provided) may exert sufficient force to return the expanding clutch 610 to the disengaged position. Alternatively, the expansion resistance of the expanding clutch 610 may be insufficient to disengaged the expanding clutch 610 from the drum 608, even when the overload clutch enters the overload state, in which case the expanding clutch 610 may continue to engage and drive the drum 608 until the flywheel is disengaged from the drum 608.

While the foregoing overload clutch mechanism may be used independently, it also may be used with a drive clutch, such as the soft-start drive clutch described above. It has been found that the combination of the features shown in FIGS. 1-12 can provide certain benefits and simultaneously address numerous criteria desired of a brushroll drive mechanism. For example, the drive clutch provides a low acceleration torque that allows the use of an overload clutch having a relatively low torque rating. This allows the overload mechanism to disengage virtually instantaneously upon sensing a relatively low force, but at the same time does not deactivate during normal drive torque fluctuations. In addition, the use of a first drive clutch that is used to engage a second drive clutch (particularly a second drive clutch that is self-adjusting) allows the first drive clutch to have a relatively light engagement spring. This feature facilitates the use of a simple engagement/disengagement mechanism, and requires relatively little force to operate the drive clutch. Thus, the shown embodiment can be operated with relative ease either manually or by a suitable electromechanical device (e.g., a solenoid). The embodiment described above also may provide overload protection that terminates all or virtually all drive torque through the overload clutch during overload conditions, and requires termination of drive torque through the drive clutch mechanism before the brushroll can be restarted, thus protecting against accidental restarts. Once the overload clutch is activated, the user must either turn off the motor or disengage the drive clutch before the overload clutch will reset. Still another benefit that may be realized from the above embodiment is a significant reduction in brushroll speed as a result of the two-stages of gear reduction provided through the clutch assembly.

While the foregoing combination of drive and overload clutch mechanisms may be desirable in some instances, alternative embodiments may replace the clutch and/or overload mechanisms with alternative structures that may provide the same or different functions. For example, the drive clutch mechanism, as described above, may be replaced without altering the overload clutch mechanism and vice versa. Further, the arrangement of the clutch assembly 100 may be altered from the relatively compact structure as described above, to an expanded arrangement having the drive and overload clutch mechanisms spatially separated along a common shaft. Such mechanisms also may be mounted on separate shafts or provided as independent modules. Thus, as should be appreciated, the embodiments presented herein may be combined in any manner and even used independently of one another. For example, the clutch mechanism of the first embodiment may be used without the overload mechanism and vice versa. It will also be understood that the various parts can be rearranged in inverted or reversed relationships. For example, the drum and expanding clutch configuration may be replaced by a spindle and contracting clutch, or the initial clutch may be a drum-type clutch that is adapted to fully engage a disk-type clutch as the main drive clutch. In other embodiments, the overload clutch may be located "upstream" of the drive clutch mechanism (that is, between the motor and the drive clutch), as opposed to being "downstream" as in the above-described embodiment. These and other variations will be understood by persons of ordinary skill in the art.

Figure 13A:
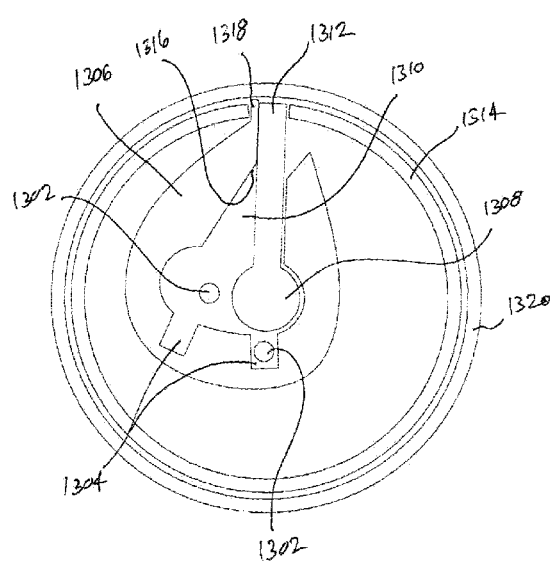
FIG. 13A is an end view of an alternative embodiment of a clutch engagement mechanism, shown in the disengaged position.
Figure 13B:
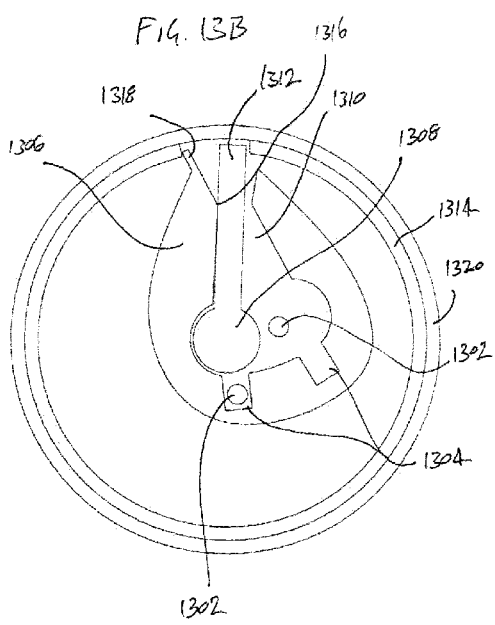
FIG. 13B is an end view of the clutch lever of FIG. 13A shown in the engaged position.

Another embodiment of a drive clutch engagement mechanism is illustrated in FIGS. 13A-13B. Like the foregoing embodiment, this embodiment uses an expanding clutch to engage a drive shaft to a drum but replaces the flywheel and clutch lever arrangement with a pin and collar structure. This arrangement is shown in the disengaged position in FIG. 13A, and in the engaged position in FIG. 13B. In this embodiment, a flywheel (not shown) such as the one described above has one or more pins 1302 that extend from the face of the flywheel. The pins 1302 fit in corresponding notches 1304 in a collar 1306. The collar 1306 generally surrounds a shaft 1308, but includes a slot 1310 to accommodate a crossbar 1312 that extends radially from the shaft 1308. An expanding clutch 1314 surrounds the collar 1306, and has a gap that accommodates the crossbar 1312, as shown in FIG. 13A. On one side of the slot 1310, the collar 1306 has a point 1316 that abuts one side of the crossbar 1312, and an extension 1318 that fits between the crossbar 1312 and the expanding clutch 1314. A drum 1320 surrounds the expanding clutch 1314 and collar 1306. The drum 1320 is driven by a motor (not shown) in a counterclockwise direction as shown by the arrow.

In the disengaged position, the collar 1306 is positioned such that the extension 1318 is generally adjacent the crossbar 1312 and the expanding clutch 1314 is elastically contracted away from the drum's inner surface. If necessary, a spring (not shown) or other device may be provided to bias the parts in this position. For example, the slot 1310 may be configured to require some amount of elastic deformation to move from the disengaged position. When it is desired to engage the clutch, the flywheel (not shown) is moved into engagement with the drum 1320, such as in the embodiment described above. Upon such engagement, friction between the drum 1320 and the flywheel rotates the pins 1302 about the shaft 1308 in a counterclockwise direction. Movement of the pins 1302 rotates the collar 1306 about the shaft 1308, as shown in FIG. 13B. In this position, the point 1316 on the slot (which may comprise a rectilinear or curved surface) contacts the side of the crossbar 1312, and acts as a fulcrum about which the collar 1306 rotates. As the collar 1306 rotates, the extension 1318 moves away from the crossbar 1312 and expands the expanding clutch 1314 by opening the gap in the clutch surface. As the expanding clutch 1314 expands, it contacts the inner surface of the drum and thereby is driven directly by the drum 1320. As with the above embodiment, the clutch may be disengaged by separating the flywheel from the drum.

Figure 14:
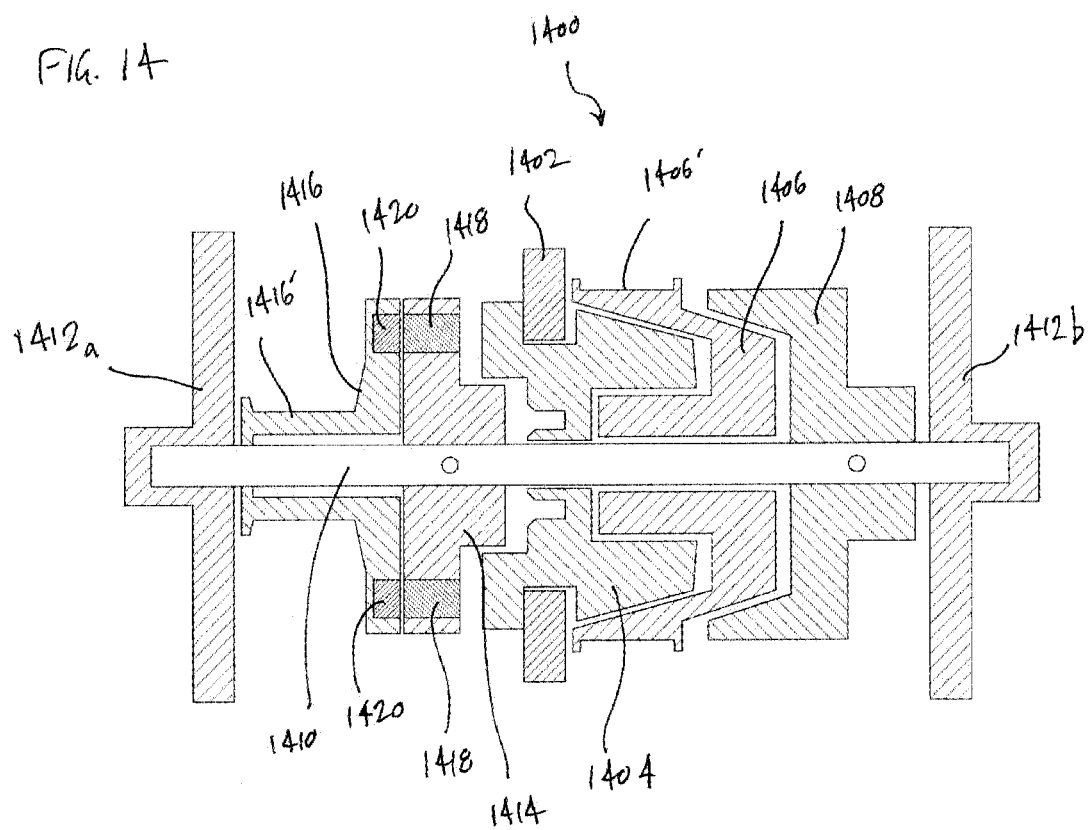
FIG. 14 is a cut-away view of a clutch assembly in accordance with another alternative embodiment.

Referring now to FIG. 14, another exemplary embodiment may provide alternative drive clutch and overload clutch mechanisms that are arranged axially upon a torque transmission shaft. The embodiment of FIG. 14 comprises a clutch assembly 1400 having a cone clutch mechanism that is used as a drive clutch, and a magnetic coupling that is used as an overload clutch. It is known in the art that cone shaped clutch mechanisms may provide efficient transfer of power. It is also known that magnets may provide a way to couple two objects, such as rotating disks, together, through an attractive magnetic force, with no contact between the objects. The attractive magnetic force must be strong enough to allow the objects to couple and rotate together to transfer the required torque loading. Such magnetic coupling may be used as an overload mechanism for the clutch assembly.

As shown, the exemplary clutch assembly 1400 may have a clutch engagement member 1402, a first cone 1404, a second cone 1406, a third cone 1408, a shaft 1410, and an overload drive plate 1414, and an output pulley 1416. The shaft 1410 may run the length of the clutch assembly 1400 and be supported by bearings 1412a and 1412b. In this embodiment, the third cone 1408 and the overload drive plate 1414 may be fixed to the shaft 1410 to rotate therewith. A spring (not shown) may be located between the first cone 1401 and the overload drive plate 1414 to bias the first cone 1404 into engagement with the second cone 1408, to thereby force it into engagement with the third cone 1408. The engagement member 1402 is provided to pull the first cone 1404 against the bias of the spring and out of disengagement. The engagement member 1402 may be automatically or manually operated, and in other embodiments, the first cone 1404 may be biased out of engagement with the second cone 1406, in which case the engagement member 1402 would be operated to engage the drive clutch, rather than disengage it.

As shown, the second cone 1406 may include a drive gear 1406' on its exterior surface. The drive gear 1406' is driven by a motor through a belt or other suitable drive mechanism. Upon engagement, the first cone 1404 presses the second cone 1406 into the third cone 1408, and the conical surfaces between the parts provide frictional engagement that locks the parts together. When fully engaged, the motor drives the third cone 1408 to rotate the shaft 1410. The second cone 1406 is not coupled to the shaft 1410, such that when the clutch is not engaged, the second cone 1406 may rotate freely around the shaft 1410 while the motor 104 is running. Of course, other kinds of surfaces may be used to frictionally engage these parts. For example, the conical surfaces may be replaced by disk-like surfaces.

The shaft 1410 drives the overload drive plate 1414, which is fixed to the shaft 1410 to rotate therewith. The overload drive plate 1414 includes one or more magnets 1418 that face the output pulley 1416. The output pulley 1416 includes its own magnets 1420, which are arranged to contact the other magnets 1418 to provide a drive coupling between these parts, as known in the art. The output pulley 1416 is freely rotatable on the shaft 1410, and the amount of torque that may be transmitted from the overload drive plate 1414 to the output pulley 1416 is limited by the magnetic properties of the magnets 1418, 1420. The output pulley 1416 includes a gear surface 1416' or other surface adapted to connect to and drive a brushroll or other downstream driven part through a belt, gears or the like.

An arrangement of magnets may be used with the magnetic overload mechanism described above. For example, the magnets on one part may all have their north poles facing the other part, and the other part may present only the south poles of its magnets. Alternatively, the poles may be oriented to alternate or provide other patterns. As another alternative, one or more of the magnets may be replaced by bars of material that are not magnetized but are attracted to the magnets that remain in the parts. Various magnetic overload configurations are disclosed in various patents discussed above, which are incorporated herein by reference.

Figure 15:
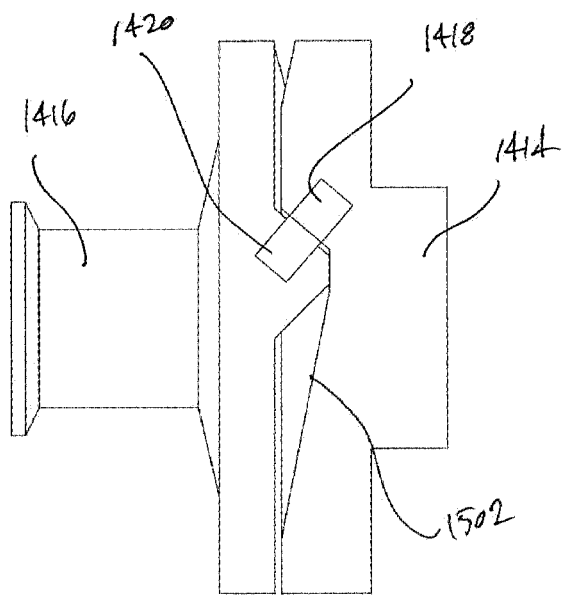
FIG. 15 is a side view of an overload mechanism in accordance with an alternative embodiment.

It should be appreciated that the magnetic overload coupling may have different configurations to improve torque transfer and overload response. For example, the embedded magnets may be mounted on angled surfaces such that the attractive force is at an angle to the shaft 1410, and some amount of axial movement must be accomplished before the magnets fully disengage. FIG. 15 depicts such an alternative embodiment of the overload drive plate 1414 and output pulley 1416. In this embodiment, the overload drive plate 1414 has angled faces in which the magnets 1418 are embedded. In FIG. 15, the overload drive plate 1414 rotates such that the side facing the viewer moves upwards. Thus, the magnets 1418, 1420 operate in tension, with magnets 1418 pulling magnets 1420 to follow the rotation of the overload drive plate 1414. When the magnets 1418, 1420 break contact, the overload drive plate 1414 and output pulley 1416 rotate relative to one another, and ramps 1502 may be provided to facilitate relative axial movement of the parts. In addition, one or both of the overload drive plate 1414 and output pulley 1416 may be axially slideable on the shaft 1410 to allow such movement. A spring or other resilient member may be used to bias the overload drive plate 1414 and output pulley 1416 together to reestablish contact, but such movement may be provided by the magnets 1418, 1420 instead. Of course, the opposite rotation may be used instead, in which the magnets 1418, 1420 tend to press together in operation.

A magnetic overload clutch also may be used with other embodiments of drive clutches. For example, the embodiments of FIG. 14 or 15 may be used with the drive clutch described in FIGS. 6 through 10A. In another embodiment, shown in FIGS. 16A-C, a magnetic overload mechanism is integrated into the expanding clutch to disengage it when the torque transmitted from the drum to the expanding clutch exceeds a threshold value.

The embodiment of FIGS. 16A-C includes a drum 1600, expanding clutch 1602, clutch mount 1604, clutch lever 1606, flywheel gear 1608 and flywheel (not shown) generally like those described above with reference to FIGS. 6-10A. As before, the expanding clutch 1602 is operated by contacting the flywheel against the drum 1600 to thereby generate a force to pivot the clutch lever 1606 and expand the expanding clutch 1602 into engagement with the drum 1600. These parts are shown in the disengaged position in FIG. 16A, and in the engaged position in FIG. 16B. In these views, the drum 1600 rotates clockwise.

The torque applied by the drum 1600 to the expanding clutch 1602 is transmitted to the clutch mount 1604, which, in turn, is connected to a brushroll or other load, either directly or through any other suitable mechanisms. The trailing end of the expanding clutch 1602 (i.e., the end an imaginary point on the drum would pass over last as it rotates) is attached to the clutch mount 1604 by one or more magnets 1610, 1612. During normal operation, the magnets 1610, 1612 hold the end of the expanding clutch 1602 and allow it to be expanded into contact with the drum 1600. The magnets 1610, 1612 transfer at least some of the torque that the drum 1600 imparts to the expanding clutch 1602 to the clutch mount 1604, to thereby rotate the clutch mount 1604. When the clutch mount 1604 encounters a rotational resistance torque, such as when the brushroll becomes obstructed or stops, the magnets 1610, 1612 may disengage, allowing the expanding clutch 1602 to contract and move out of engagement with the drum 1600. This overload condition is shown in FIG. 16C. Thus, the magnets 1610, 1612 act as an overload clutch mechanism. The strengths and orientations of the magnets 1610, 1612 may, of course, be modified to regulate the torque rating of the overload clutch. In addition, a counterweight 1616 may be attached to the clutch mount 1604 to help balance the weight of the magnets 1610, 1612 to prevent excessive vibrations.

In the embodiment of FIGS. 16A-C, the clutch mount 1604 does not disengage from the brushroll during an overload condition. Thus, the flywheel gear 1608 still continues to apply a torque to rotate the clutch lever 1606 and rotate the clutch mount 1604. At the same time, this torque may keep the clutch lever 1606 at least partially rotated which may hold the expanding clutch 1602 so that its magnets 1610 can not reengage the magnets 1612 on the clutch mount 1604, as shown in FIG. 16C. During this time, the flywheel may remain in contact with the drum 1600, generating friction between the parts. As such it is preferred for the contact surfaces between flywheel and drum 1600 to be made of a heat-resistant material. Once the flywheel is disengaged form the drum 1600, the clutch lever 1604 can pivot back to its resting disengaged position, and the magnets 1610, 1612 can reengage.

Figure 17:
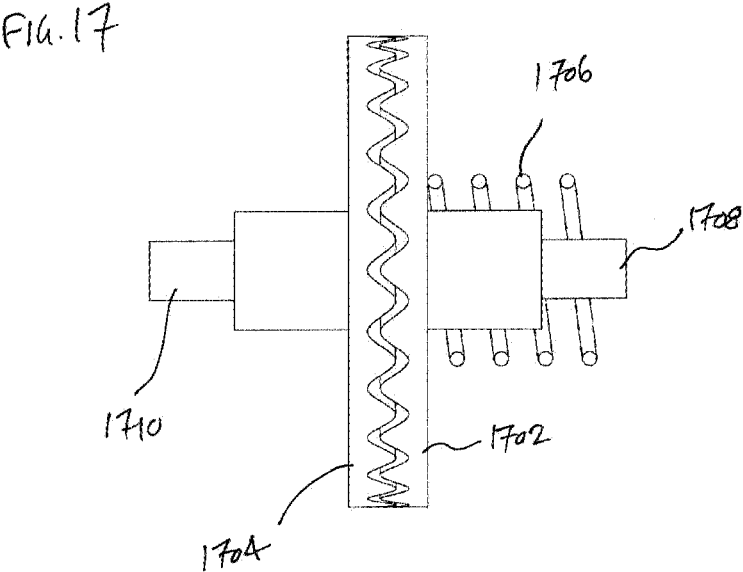
FIG. 17 is a side view of a clutch mechanism in accordance with another alternative embodiment.

Still other overload and drive clutch devices may be used with other embodiments. For example, as FIG. 17 discloses a wave plate clutch that may be used as an overload clutch in a vacuum cleaner, either on its own or in conjunction with a drive clutch such as the ones described herein. The embodiment of FIG. 17 provides a wave plate-type clutch having a first plate 1702 that is biased by a spring 1706 to press against a second plate 1704. The first plate 1702 is driven by a first shaft 1708, and the second plate drives a second shaft 1710. This clutch will transmit torque until sufficient differential loads exist to press the engaged structures out of engagement against the bias of the spring 1706, as will be appreciated by persons of ordinary skill in the art. Upon clearance of the resistance torque, normal operation may automatically resume.

Figure 18A:
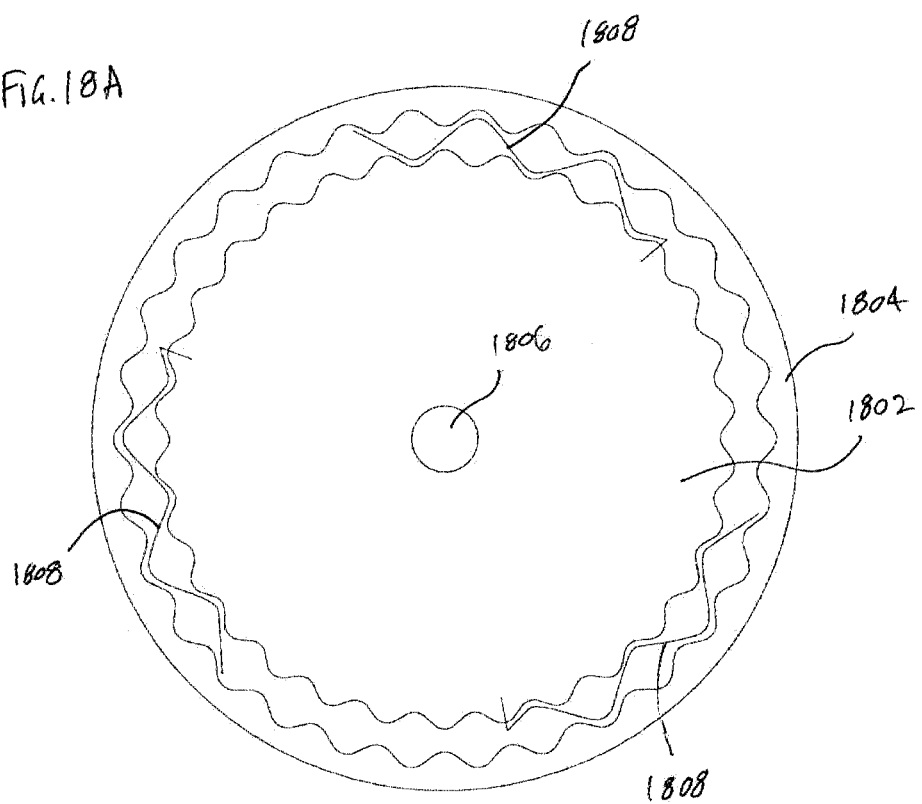
FIG. 18A is a side view of a clutch mechanism in accordance with another alternative embodiment.

Alternatively, a clutch mechanism may use a friction forces from spring located between two toothed wheels to transmit torque. Such an embodiment is shown in FIGS. 18A-C. In this exemplary embodiment, a clutch mechanism may have an inner wheel 1802 with a toothed profile around the outer diameter. The inner wheel 1802 may be mounted to a shaft (not shown) by an inner hole 1806. An outer wheel 1804 surrounds the inner wheel 1802, and has an internally-facing toothed profile, similar to that of the inner wheel 1802, around its inner diameter. One of the two wheels is driven by a motor, either directly or through a drive clutch or other mechanisms, and the other transmits the drive torque to an output device, such as a brushroll. In the shown embodiment, for example, the outer wheel 1804 may be drive by expanding clutch mechanism, such as described above, such engaging the expanding clutch imparts a drive torque to the outer wheel 1804 to rotate as shown by the arrow. One or more elastic springs are located between the inner wheel 1802 and outer wheel 1804 to transfer drive torque from the outer wheel 1804 to the inner wheel 1802. For example, a number of thin, flat metal strings or ribbons 1808 may be located between the teeth of the inner wheel 1802 and the outer wheel 1804. While three are shown, four or other numbers of ribbons 1802 may be used.

The ribbons 1808 are shaped so that they can transfer torque from the teeth on the outer wheel 1804 to the teeth on the inner wheel 1802. For example, as shown, the ribbons 1808 may have a curved profile that simultaneously fits between one or more teeth on each wheel 1802, 1804. In normal operation, as shown in FIG. 18B, the ribbons are strong enough to generally maintain their shape and transmit torque from the outer wheel 1804 to the inner wheel 1802. However, when the inner wheel 1802 encounters sufficient resistance, the ribbons 1808 may be deform and flattened, such as shown in FIG. 18C, and thus disengage the teeth of one or both of the wheels 1802, 1804. When this occurs, the wheels 1802, 1804 can rotate relative to one another, and the inner wheel 1802 may slow or stop. Upon clearing whatever caused the resistance on the inner wheel 1802, the ribbons 1808 return to their original shape, and normal operation may resume.

The present disclosure describes a number of new, useful and nonobvious features and combinations of features that may be used alone or together with vacuum cleaners and other kinds of appliances or devices that require selective torque coupling, overload protection or both. The various parts and devices shown herein may be made using any suitable technology, such as machining, casting, injection molding, sintering, and the like, and may comprise any suitable material, such as iron, plastic (ABS, PA, reinforced, or other kinds of plastic), aluminum, steel, and so on. The selection of the manufacturing method and material will depend on typical engineering factors and will be appreciated by the person of ordinary skill in the art without further explanation herein. In addition, the various parts provided in the embodiments described herein can be rearranged, such as by placing an overload clutch between a motor and an engagement clutch, and so on. The embodiments described herein are all exemplary, and are not intended to limit the scope of the inventions in any way. It will be appreciated that the inventions described herein can be modified and adapted in various ways and for different uses. For example, embodiments of the invention may be used to drive motorized wheels on a vacuum cleaner, or to drive other household or industrial appliances or equipment that require selective application of drive torque to one or more moving parts or overload protection features. All such modifications and adaptations are included in the scope of this disclosure and the appended claims.

We claim:

1. A vacuum cleaner agitator drive assembly, the vacuum cleaner agitator drive assembly comprising:
   a motor;
   an agitator;
   a clutch assembly input adapted to be driven by the motor;
   a clutch assembly output adapted to drive the agitator;
   a starter clutch moveable between an engaged starter clutch position in which the starter clutch receives a first drive torque from the clutch assembly input, and a disengaged starter clutch position in which the starter clutch receives substantially no torque directly from the clutch assembly input; and
   a drive clutch moveable between an engaged drive clutch position in which the drive clutch receives a second drive torque from the clutch assembly input, and a disengaged drive clutch position in which the drive clutch receives substantially no torque directly from the clutch assembly input;
   wherein the starter clutch is coupled to the drive clutch such that the starter clutch, when in the engaged starter clutch position, can transmit the first drive torque to the drive clutch to move the drive clutch into the engaged drive clutch position;
   wherein the drive clutch is coupled to the clutch assembly output such that the drive clutch, when in the engaged drive clutch position, can transmit the second drive torque to the clutch assembly output wherein the clutch assembly input comprises a drum having an inner drum surface and the drive clutch engages the inner drum surface in the engaged drive clutch position, and does not engage the inner drum surface in the disengaged drive clutch position;
   wherein the drive clutch comprises:
      a clutch mount rotatably mounted within the drum,
      an expanding clutch mounted to the clutch mount and movable between an expanded position in which the expanding clutch contacts the inner drum surface when the drive clutch is in the engaged drive clutch position, and a contracted position in which the expanding clutch does not substantially contact the inner drum surface when the drive clutch is in the disengaged drive clutch position, wherein, when the drive clutch is in the engaged drive clutch position, the expanding clutch transmits the at least a portion of the drive torque from the drum and to the clutch mount,
      a clutch lever pivotally mounted to the clutch mount, wherein a first end of the expanding clutch is mounted to a first end of the clutch lever, a second end of the expanding clutch is mounted to the clutch mount, a second end of the clutch lever is moveable from a first lever position in which the expanding clutch is in the expanded position, and a second lever position in which the expanding clutch is in the contracted position, and the clutch lever is biased into the second lever position; and
   wherein the starter clutch applies an engagement force to bias the clutch lever towards the first lever position when the starter clutch is in the engaged starter clutch position.

2. The vacuum cleaner agitator drive assembly of claim 1, wherein:
   the clutch assembly input comprises a drum having a side drum surface; and the starter clutch engages the side drum surface in the engaged starter clutch position, and does not engage the side drum surface in the disengaged starter clutch position.

3. The vacuum cleaner agitator drive assembly of claim 2, wherein:
the drum further comprises an inner drum surface; and
the drive clutch engages the inner drum surface in the engaged drive clutch position, and does not engage the inner drum surface in the disengaged drive clutch position.

4. The vacuum cleaner agitator drive assembly of claim 1, further comprising:
an overload clutch coupled to the drive clutch such that the overload clutch receives the second drive torque from the drive clutch when the drive clutch is in the engaged drive clutch position, the overload clutch being moveable between an engaged overload clutch position in which the overload clutch transmits the second drive torque to the clutch assembly output, and a disengaged overload clutch position in which the overload clutch transmits substantially none of the second drive torque to the clutch assembly output.

5. The vacuum cleaner agitator drive assembly of claim 4, wherein the overload clutch comprises:
an overload cog; and
an overload spring;
wherein, when the overload clutch is in the engaged overload clutch position the overload spring interfaces with the overload cog to transmit the second drive torque through the overload clutch, and when the overload clutch is in the disengaged overload clutch position the overload spring deforms sufficiently to prevent the transmission of at least a substantial amount of the second drive torque through the overload clutch.

6. The vacuum cleaner agitator drive assembly of claim 5, wherein the overload spring is connected to the drive clutch and adapted to rotate therewith and the overload cog is connected to the clutch assembly output and adapted to rotate therewith.

7. The vacuum cleaner agitator drive assembly of claim 5, wherein the drive clutch may be biased into the disengaged drive clutch position when the overload clutch is in the disengaged overload clutch position.

8. The vacuum cleaner agitator drive assembly of claim 2, further comprising:
an overload clutch coupled to the drive clutch such that the overload clutch receives the second drive torque from the drive clutch when the drive clutch is in the engaged drive clutch position, the overload clutch being moveable between an engaged overload clutch position in which the overload clutch transmits the second drive torque to the clutch assembly output, and a disengaged overload clutch position in which the overload clutch transmits substantially none of the second drive torque to the clutch assembly output; and
wherein the overload clutch is located within the drum.

9. The vacuum cleaner agitator drive assembly of claim 8, wherein the drive clutch is located within the drum.

10. The vacuum cleaner agitator drive assembly of claim 1, wherein the starter clutch is biased in the engaged starter clutch position, and the clutch assembly further comprises a starter clutch control mechanism that is selectively operable to move the starter clutch into the disengaged starter clutch position.

11. The vacuum cleaner agitator drive assembly of claim 1, wherein the second drive torque is greater than the first drive torque.

12. A vacuum cleaner agitator drive assembly, the vacuum cleaner agitator drive assembly comprising:
a motor adapted to generate a drive torque;
an agitator;
a clutch assembly input adapted to be driven by the drive torque;
a clutch assembly output adapted to drive the agitator;
a drive clutch adapted to selectively transmit at least a portion of the drive torque from the clutch assembly input to the clutch assembly output;
a starter clutch adapted to selectively engage the drive clutch by transmitting a starting torque from the clutch assembly input to the drive clutch
wherein the clutch assembly input comprises a drum having an inner drum surface and the drive clutch engages the inner drum surface in the engaged drive clutch position, and does not engage the inner drum surface in the disengaged drive clutch position;
wherein the drive clutch comprises:
a clutch mount rotatably mounted within the drum,
an expanding clutch mounted to the clutch mount and movable between an expanded position in which the expanding clutch contacts the inner drum surface when the drive clutch is in the engaged drive clutch position, and a contracted position in which the expanding clutch does not substantially contact the inner drum surface when the drive clutch is in the disengaged drive clutch position, wherein, when the drive clutch is in the engaged drive clutch position, the expanding clutch transmits the second drive torque from the drum and to the clutch mount,
a clutch lever pivotally mounted to the clutch mount, wherein a first end of the expanding clutch is mounted to a first end of the clutch lever, a second end of the expanding clutch is mounted to the clutch mount, a second end of the clutch lever is moveable from a first lever position in which the expanding clutch is in the expanded position, and a second lever position in which the expanding clutch is in the contracted position, and the clutch lever is biased into the second lever position; and
wherein the starter clutch applies an engagement force to bias the clutch lever towards the first lever position when the starter clutch is in the engaged starter clutch position.

13. The vacuum cleaner agitator drive assembly of claim 12, wherein the drive clutch further comprises a self-adjusting clutch that increases the drive torque as a rotational resistance of the clutch assembly output increases.

14. The vacuum cleaner agitator drive assembly of claim 12, wherein the starter clutch is a graduated engagement clutch.

15. A vacuum cleaner agitator drive assembly, the vacuum cleaner agitator drive assembly comprising:
a motor;
an agitator;
a clutch assembly input adapted to be driven by the motor;
a clutch assembly output adapted to drive the agitator;
a drive clutch adapted to selectively transmit a drive torque from the clutch assembly input to the clutch assembly output; and
a starter clutch adapted to selectively engage the drive clutch by transmitting a starting torque from the clutch assembly input to the drive clutch;

wherein the clutch assembly input comprises a drum having an inner drum surface and the drive clutch engages the inner drum surface in the engaged drive clutch position, and does not engage the inner drum surface in the disengaged drive clutch position;

wherein the drive clutch comprises:
- a clutch mount rotatably mounted within the drum,
- a self-adjusting clutch mounted to the clutch mount that expands to increases the drive torque as a rotational resistance of the clutch assembly output increases, and
- a clutch lever pivotally mounted to the clutch mount, wherein a first end of the self-adjusting clutch is mounted to a first end of the clutch lever, a second end of the self-adjusting clutch is mounted to the clutch mount, a second end of the clutch lever is moveable from a first lever position in which the self-adjusting clutch is in an expanded position and a second lever position in which the self-adjusting clutch is in a contracted position, wherein the clutch lever is biased into the second lever position;

wherein the starter clutch applies an engagement force to bias the clutch lever towards the first lever position when the starter clutch is in an engaged starter clutch position.

16. The vacuum cleaner agitator drive assembly of claim 15, further comprising an overload clutch operatively coupling the clutch assembly output to the agitator, and being adapted to substantially terminate the transfer of drive torque from the clutch assembly output to the agitator upon reaching a predetermined torque limit.

17. The vacuum cleaner agitator drive assembly of claim 15, further comprising an overload clutch operatively coupling the drive clutch to the clutch assembly output, and being adapted to substantially terminate the transfer of drive torque from the drive clutch to the clutch assembly output upon reaching a predetermined torque limit.

* * * * *